(12) United States Patent
Bass et al.

(10) Patent No.: US 8,356,673 B2
(45) Date of Patent: Jan. 22, 2013

(54) DOWN-HOLE TRANSMITTER SYSTEM, METHOD OF INDUCING A TRANSIENT ELECTROMAGNETIC FIELD IN AN EARTH FORMATION, METHOD OF OBTAINING A TRANSIENT ELECTROMAGNETIC RESPONSE SIGNAL, AND METHOD OF PRODUCING A HYDROCARBON FLUID

(75) Inventors: Ronald Marshall Bass, Houston, TX (US); Robert Rex Burnett, Katy, TX (US); Richard Martin Ostermeier, Houston, TX (US); Jeremiah Glen Pearce, Houston, TX (US); William Mountjoy Savage, Houston, TX (US)

(73) Assignee: Shell Oil Company, Houston, TX (US)

( * ) Notice: Subject to any disclaimer, the term of this patent is extended or adjusted under 35 U.S.C. 154(b) by 339 days.

(21) Appl. No.: 12/666,012

(22) PCT Filed: Jul. 1, 2008

(86) PCT No.: PCT/US2008/068899
§ 371 (c)(1),
(2), (4) Date: Nov. 3, 2010

(87) PCT Pub. No.: WO2009/006467
PCT Pub. Date: Jan. 8, 2009

(65) Prior Publication Data
US 2011/0036569 A1    Feb. 17, 2011

Related U.S. Application Data

(60) Provisional application No. 60/947,832, filed on Jul. 3, 2007.

(51) Int. Cl.
*E21B 47/00* (2012.01)
*G01V 3/18* (2006.01)

(52) U.S. Cl. ............. 166/369; 166/250.16; 324/339
(58) Field of Classification Search ............... 166/369, 166/250.16; 324/339
See application file for complete search history.

(56) References Cited

U.S. PATENT DOCUMENTS

| | | | |
|---|---|---|---|
| 595,584 A | 12/1897 | Schutt | |
| 3,209,323 A * | 9/1965 | Grossman, Jr. | 340/853.3 |
| 4,107,598 A | 8/1978 | Meador et al. | 324/6 |
| 4,469,961 A | 9/1984 | Milberger et al. | 307/270 |
| 5,485,089 A | 1/1996 | Kuckes | 324/346 |
| 5,530,355 A | 6/1996 | Doty | 324/318 |
| 5,554,929 A | 9/1996 | Doty et al. | 324/318 |
| 5,796,253 A | 8/1998 | Bosnar et al. | 324/336 |

(Continued)

FOREIGN PATENT DOCUMENTS

| WO | WO02075364 | 9/2002 |
|---|---|---|
| WO | WO2006071615 | 7/2006 |

(Continued)

*Primary Examiner* — William P Neuder

(57) ABSTRACT

A down-hole tool provided with a transmitter system for inducing a transient electromagnetic field in an earth formation has an induction coil with a number of windings to generate essentially a magnetic dipole field. The number of windings is divided into two or more groups of windings arranged to cooperatively generate the essentially magnetic dipole field when energized. Switching means are arranged to essentially simultaneously terminate the energizing of the groups of windings. The groups of windings are electrically isolated from each other or connected in parallel to each other, at least when the energizing is terminated. A transient electromagnetic field may thus be induced in an earth formation by essentially simultaneously terminating energizing each group of windings by operating the switching means. A transient electromagnetic response signal may be recorded, and used in a method of producing a mineral hydrocarbon fluid.

15 Claims, 15 Drawing Sheets

U.S. PATENT DOCUMENTS

| | | | |
|---|---|---|---|
| 6,166,540 A | 12/2000 | Wollin | 324/300 |
| 6,777,940 B2 | 8/2004 | Macune | 324/338 |
| 6,933,724 B2 | 8/2005 | Watkins et al. | 324/319 |
| 7,053,622 B2 | 5/2006 | Sorensen | 324/346 |
| 2003/0105591 A1 | 6/2003 | Hagiwara | 702/7 |
| 2004/0017193 A1 | 1/2004 | Speier | 324/303 |
| 2004/0163822 A1 | 8/2004 | Zhang et al. | 166/380 |
| 2005/0078481 A1 | 4/2005 | Hanis et al. | 362/276 |
| 2005/0092487 A1 | 5/2005 | Banning et al. | 166/254.1 |
| 2005/0093546 A1 | 5/2005 | Banning et al. | 324/338 |
| 2005/0189945 A1 | 9/2005 | Reiderman | 324/333 |
| 2006/0038571 A1 | 2/2006 | Ostermeier et al. | 324/338 |
| 2006/0202699 A1 | 9/2006 | Reiderman | 324/339 |
| 2006/0290529 A1 | 12/2006 | Flanagan | 340/854.6 |

FOREIGN PATENT DOCUMENTS

WO  WO2007019139  2/2007

* cited by examiner

DOWN-HOLE TRANSMITTER SYSTEM, METHOD OF INDUCING A TRANSIENT ELECTROMAGNETIC FIELD IN AN EARTH FORMATION, METHOD OF OBTAINING A TRANSIENT ELECTROMAGNETIC RESPONSE SIGNAL, AND METHOD OF PRODUCING A HYDROCARBON FLUID

PRIORITY CLAIM

The present application claims priority from PCT/US2008/068899, filed 1 Jul. 2008, which claims priority from U.S. Provisional Application 60/947,832 filed 3 Jul. 2007.

FIELD OF THE INVENTION

The present invention relates to a down-hole transmitter system and a method for inducing a transient electromagnetic field in an earth formation. In another aspect, the invention relates to a method of obtaining a transient electromagnetic response signal from an earth formation. In still another aspects, the invention relates to quantifying hydrocarbon content of a subterranean reservoir and a method of producing a mineral hydrocarbon fluid from an earth formation.

BACKGROUND OF THE INVENTION

In logging while drilling (LWD) applications, it is advantageous to detect the presence of a formation anomaly ahead of a drill bit or around a bottom hole assembly.

U.S. patent application published under number 2006/0038571 describes methods for localizing an electromagnetic anomaly in a subterranean earth formation, employing transient electromagnetic methods. These methods particularly enable finding direction and distance from a transient electromagnetic measurement tool to a resistive or conductive anomaly in a formation surrounding a borehole in drilling applications.

In these methods, typically a tool, comprising a transmitter coil and a receiver coil, is lowered into a borehole in the earth formation. The transmitter coil produces a magnetic dipole field in the formation. Due to, for instance geometric properties of the transmitter system, in practice the dipole field will be an approximate dipole field. A transient response signal, comprising an induced voltage in the receiver coil, is measured after rapidly turning off the current that is passed through the transmitter antenna. The sudden drop is understood to generate decaying eddy currents in the formation, which in turn induce the transient response signal at the receiver antenna.

The referenced US patent application shows that relevant conductivity information of the earth formation is embodied in the response signals over the entire time span of the decay, starting already during the first microseconds after the sudden drop in the current and continuing up to perhaps even seconds.

The probing distance from the tool into the formation increases with length of the time span during which the decay is measurable. Thus, the minimum probing distance is limited by how fast the transmission can be terminated, and the maximum available probing distance is in practice limited by the fact that the response signals have decayed to such low values that they become impossible to measure with an acceptable signal-to-noise ratio.

This drives a need for increasing the signal relative to the noise, while maintaining an acceptable time resolution.

SUMMARY OF THE INVENTION

In one aspect, the invention provides a transmitter system for inducing a transient electromagnetic field in an earth formation, comprising an induction coil with a number of windings to generate essentially a magnetic dipole field, which number of windings is divided into two or more groups of windings arranged to cooperatively generate the essentially magnetic dipole field when energized; and switching means arranged to essentially simultaneously terminate the energizing of the groups of windings; wherein the groups of windings are electrically isolated from each other or connected in parallel to each other, at least when the energizing is terminated.

Such a transmitter is capable of switching off a higher magnetic field in a given amount of time than a transmitter system consisting of a single undivided coil, because it is adapted to lower back-electromagnetic force (back-EMF) voltage spikes. This may facilitate a higher signal-to-noise ratio, because given a certain desired—or tolerable—maximum voltage spike, the generated magnetic field may be higher, and as a result the induction signals may be higher.

In another aspect, the invention provides a method of inducing a transient electromagnetic field in an earth formation, comprising the steps of providing in the earth formation an inductive load in the form of an induction coil with a number of windings that is divided into two or more groups of windings arranged to cooperatively generate essentially a magnetic dipole field when energized; energizing the groups of windings, thereby generating the magnetic dipole field; and essentially simultaneously terminating energizing each group of windings.

In still another aspect, the invention provides a method of obtaining a transient electromagnetic response signal from an earth formation, comprising the steps of: providing a receiver antenna in the earth formation; providing, in the earth formation, a transmitter antenna comprising an inductive load in the form of an induction coil with a number of windings that is divided into two or more groups of windings arranged to cooperatively generate essentially a magnetic dipole field when energized; energizing the groups of windings, thereby generating the magnetic dipole field; essentially simultaneously terminating energizing each group of windings; and receiving a transient response signal following the terminating of the energizing, by employing the receiver antenna.

In still another aspect the invention provides a method of producing a mineral hydrocarbon fluid from an earth formation, the method comprising steps of: drilling a well bore in the earth formation; providing, in the well bore, an inductive load in the form of an induction coil with a number of windings that is divided into two or more groups of windings arranged to cooperatively generate essentially a magnetic dipole field when energized; energizing the groups of windings, thereby generating the magnetic dipole field; essentially simultaneously terminating energizing each group of windings by operating each of the switches; receiving a transient response signal following the terminating of the energizing; further processing the transient response signal to locate the mineral hydrocarbon fluid in the earth formation; continuing drilling the well bore to the hydrocarbon fluid; and producing the hydrocarbon fluid.

A geosteering cue may be derived from the further processing, whereby the continued drilling may be responsive to the geosteering cue.

BRIEF DESCRIPTION OF THE DRAWINGS

The present invention is described in more detail below by way of examples and with reference to the attached drawing figures, wherein.

DETAILED DESCRIPTION OF THE INVENTION

Figure 1:
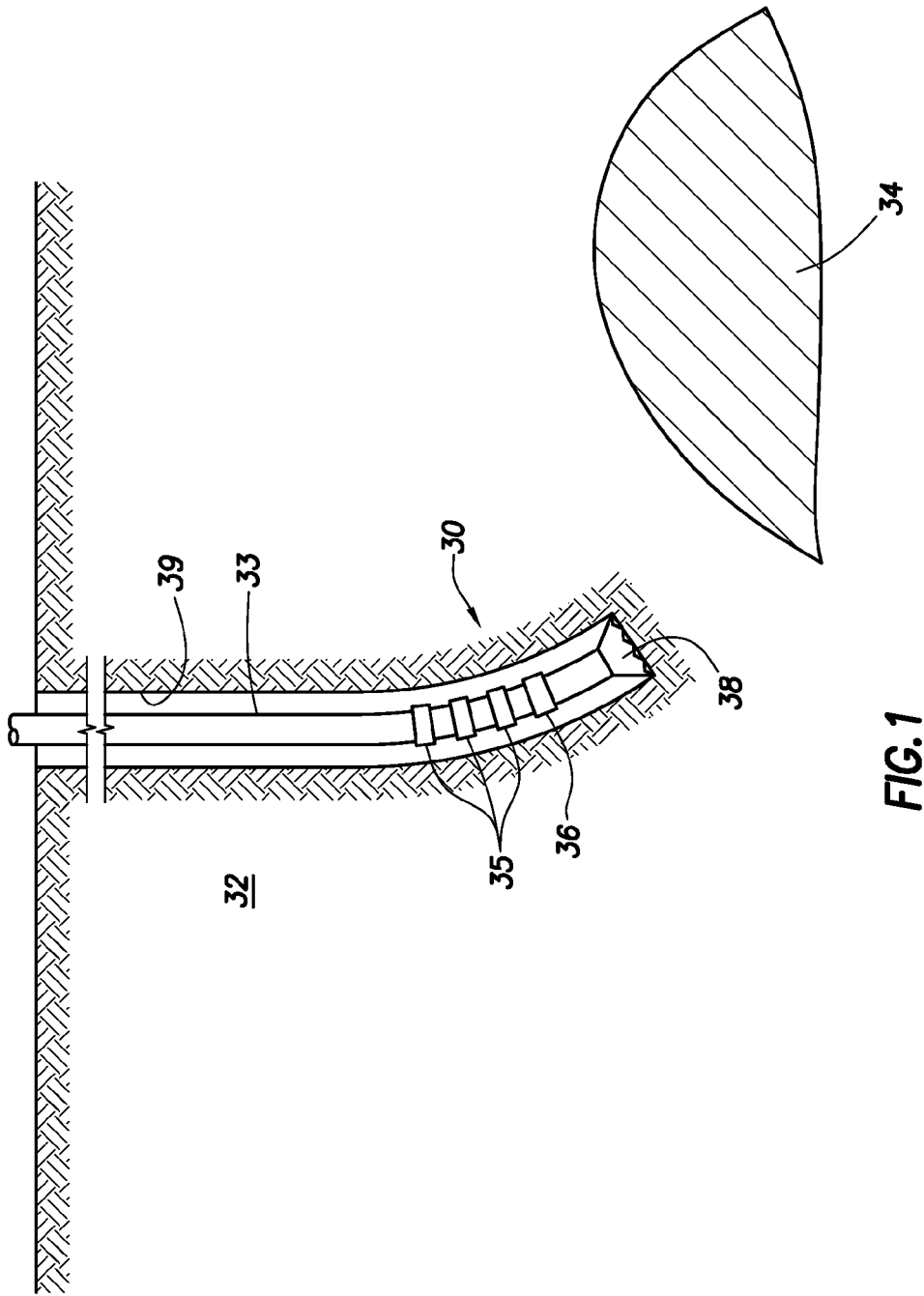
FIG. 1 schematically shows a drilling system.

A tool and method are disclosed for transient electromagnetic (EM) logging, which provides information on electromagnetic properties of a formation around the tool at various distances from the tool. In this transient EM method, a transmitter antenna is energized which energizing is generally terminated after which a temporal change of signal (e.g. voltage) induced in a receiver antenna is monitored over time.

The transmitter and receiver antennae may be provided in the form of coils as described in, for instance, US patent application publications 2005/0092487, 2005/0093546, and 2005/078481, and in U.S. Pat. No. 5,955,884, each incorporated herein by reference. On the transmitter end, such a coil represents an inductive load.

The coils may be wound coaxially around a longitudinal axis of a down-hole tool, or they may be provided in another way. Examples include winding at an angle relative to the longitudinal axis of the down-hole tool, or winding according to a so-called saddle coil configuration whereby the windings of the coil do not fully encircle the longitudinal axis of the down-hole tool. Energizing of the transmitter antenna may be accomplished by applying a current through a transmitter coil. The current applied at a transmitter antenna is generally terminated to terminate the energizing.

However, when the current flow through such a coil is suddenly dropped or terminated, a voltage spike is built across the coil due to back-electromagnetic force (back-EMF or counter-EMF) effects. This voltage spike may exceed maximum tolerances of one or more of the components in the tool. In order to reduce the back-EMF voltage on given coil, one has to accept either a lower current (resulting in a lower magnetic field) or in a slower turn-off rate (resulting in difficulties measuring transient response signals from the earth formation at short time scales).

It is now proposed to divide the number of windings of a coil into two or more groups of windings arranged to cooperatively generate the essentially magnetic dipole field when energized, and to provide switching means arranged to essentially simultaneously terminate the energizing of at least two of the groups of windings. The entire arrangement is such that, at least when the energizing is terminated, the groups of windings are electrically isolated from each other or connected in parallel with each other.

Herewith it is avoided that groups of windings are connected in series with one or more other groups of windings after terminating the energizing. By avoiding that groups of windings are connected in series with one or more other groups of windings after terminating the energizing, the back-EMF voltage is lowered.

This lowers the back-EMF voltage because the total voltage is divided over the groups of coils. Moreover, dividing the coil into groups of windings allows optimization of the geometry such that the mutual induction between the groups is lowered, resulting in an even lower back-EMF voltage altogether.

The terms "groups of windings" and "group of windings" will hereinafter also be referred to as "coil segments" and "coil segment" or plainly "segments" and "segment". The coils may be solenoid coils and, likewise, the groups of windings may also be solenoidal of nature.

Essentially simultaneous terminating the energizing is understood to cover at least the cases wherein the groups of windings are turned off in a time on the order of an inherent internal turn-off time of the individual groups of windings that is governed by for instance internal resonances and relaxation rates.

The proposed methods allow switching an as high-strength as possible electromagnetic field to a much lower field strength in an as short a time as possible, which facilitates locating a mineral hydrocarbon fluid reservoir in an earth formation.

It is remarked that U.S. Pat. No. 7,053,622 discloses measuring equipment and method for mapping the geology in an underground formation by means of transient electromagnetic sounding. The equipment disclosed therein has been made suitable for carrying out such soundings while being transported in the air. The transmitter coil measures 10×10 m, and moreover the receiver coil is placed outside of the perimeter of the transmitter coil, and for these reasons the equipment known from the U.S. patent '622 is not able to fit in a down-hole tool adapted to fit in a borehole in an earth formation. The disclosed soundings employ a very large magnetic moment, typically exceeding 5000 A·m².

FIG. 1 shows a down-hole tool 30 for electromagnetic induction measurements of an earth formation 32. The down-hole tool is adapted to fit inside a typical bore-hole in an earth formation. In the embodiment as shown, the down-hole tool 30 is incorporated in a drill string 33 supporting a drill bit 38 in a bore-hole 39. A reservoir containing a mineral hydrocarbon fluid 34 is also present.

The down-hole tool 30 may typically be included in a bottom hole assembly (BHA) as part of a logging while drilling (LWD) tool and/or of a measurement while drilling (MWD) tool. The tool may be used in logging and/or measurement while drilling applications, including geo-steering, reservoir delineation and geo-pressure detection.

In other embodiments, the down-hole tool may be suspended in the bore-hole 39 on a wire line. Wire line tools as such are known: one is shown and described in U.S. Pat. No. 6,952,101, of which the contents are herein incorporated by reference.

The down-hole tool 30 as depicted in present FIG. 1 comprises a transmitter system comprising transmitter antenna 35 and a sensor in the form of a receiver antenna 36 displaced from the transmitter antenna 35 at a predetermined offset. A predetermined offset, however, is not a requirement of the invention.

Figure 2B:
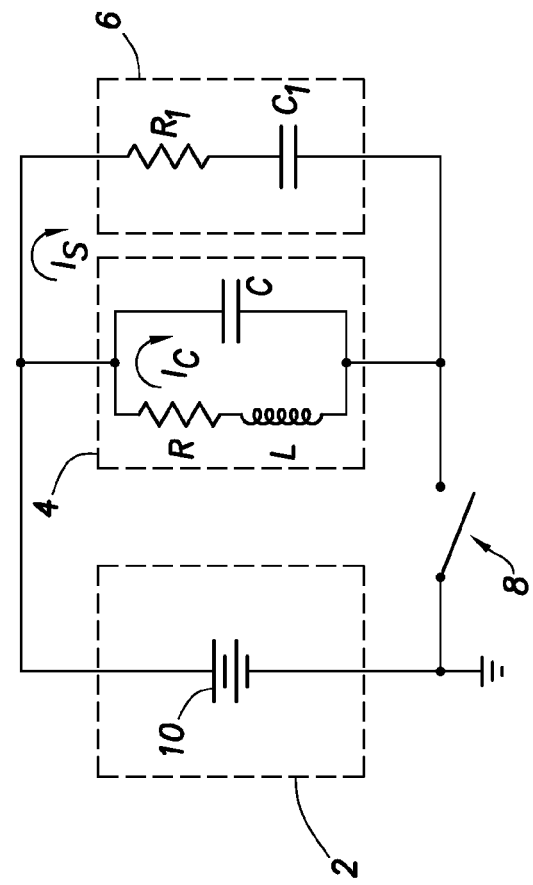
FIG. 2B schematically shows an electrical equivalent circuit corresponding to FIG. 2A.
Figure 2A:
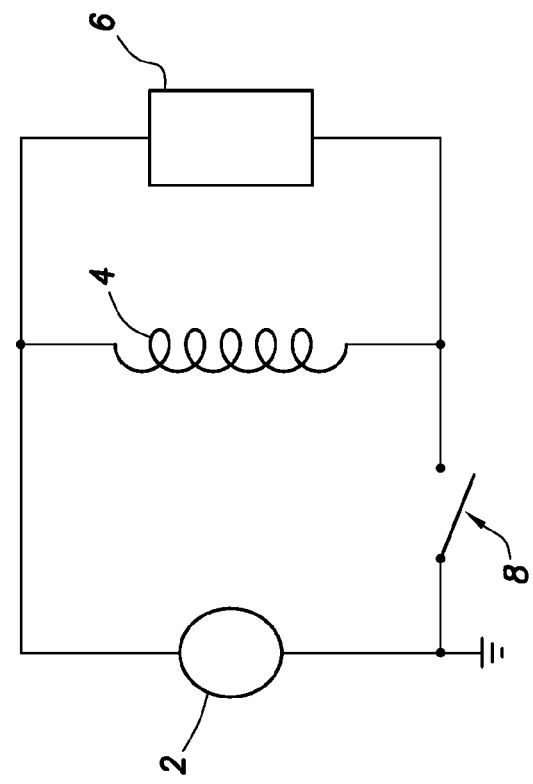
FIG. 2A schematically shows a coil connected to a power supply and a snubber circuit.

FIGS. 2A and 2B schematically show a comparative transmitter system. FIG. 2A schematically shows a transmitter antenna in the form of coil 4 connected to a power supply 2 via a switch 8. An optional shunt in the form of snubber circuit 6 is connected parallel to the coil 4.

FIG. 2B shows a possible equivalent electric circuit of the comparative example. A physical coil 4, typically not only provides an inductance L but also a non-zero resistance R and a distributed capacity C as shown in FIG. 2B. These properties may give rise to a resonance current in the coil, $I_c$, also indicated in FIG. 2B.

The optional snubber circuit 6 has been assumed to comprise a resistor $R_1$ and a series capacitor $C_1$, tuned to prevent the current from oscillating as well as to control the current decay $I_c(t)$ within the coil 4. It could, however, include more and/or other components, as will be exemplified below, or the snubber circuit 6 could consist of a damping resistor only.

The power source 2 has been assumed to comprise of a DC voltage source 10. For the purpose of the present specification, a DC voltage may include relatively slowly varying voltage waveforms compared to the desired measurement interval, or AC waveforms with a non-zero DC offset component that is large relative to the AC component. Slowly varying is understood to include frequencies of up to a few Hz, typically up to about 5 or 10 Hz, depending on the desired measurement interval. Preferably, the DC current is very constant and steady for at least 10 ms prior to turn-off.

The DC voltage source 10 may be a bipolar source switched such that the polarity of the voltage imposed over the transmitter coil is reversed in each subsequent energizing cycle.

The switch 8 will be assumed to comprise of an ideal switch capable of switching between true zero impedance and infinite impedance states instantaneously.

When the switch has been closed (its zero impedance or zero-resistance state) for a sufficiently long time, a DC current I corresponding to I=V/R passes through the coil 4 causing a static magnetic field. Prior to opening switch 8, the inductor L acts as a short due to the DC character of the current. The voltage across the coils, $V_c$, is therefore equal to the voltage V of the source 10.

Opening switch 8, resulting in an instantaneous increase in its resistance from essentially zero to essentially infinite provided that the voltage across it does not exceed a break-down limit, would collapse the static magnetic field. Faraday's law states that a changing magnetic field results in an electromotive force (EMF, ξ) that is equal to the time-derivative (d/dt) of the magnetic flux.

Since part of the flux associated with the magnetic field passes through the coil 4, switching it off causes a back EMF. A back EMF that is too large may cause a problem on for instance the switch 8.

The total voltage across the coil 4 is given by the sum of the back-EMF plus R·I(t). In an induction coil, the back-EMF may be expressed as its self-inductance L times the time-derivative $dI_c/dt$ of the current $I_c(t)$. Thus, after opening the switch 8, the EMF is likely to become the dominant term. Since current $I_c(t)$ is decaying, the voltage across the inductive load L will have a reverse polarity relative to that across the resistor R.

The current $I_c(t)$ in the coil 4 may be calculated using the equivalent electric circuit as depicted in FIG. 2B. As a comparative example, Table I summarizes parameters of a transmitter coil as it might be employed in a down-hole transient EM tool.

TABLE I

| Parameter | Symbol | value |
|---|---|---|
| Coil diameter |  | 14 cm |
| Number of windings | N | 125 |
| Pitch of windings |  | 2 mm |
| Axial length of coil | l | 25 cm |
| Self-inductance of coil | L | 0.95 mH |
| Ohmic resistance of coil | R | 0.46 Ω |
| Distributed Capacitance coil | C | 50 pF |
| Snubber Resistance | $R_1$ | 2100 Ω |
| Snubber Capacitance | $C_1$ | 1 µF |

Self-inductance has been derived from the dimensions using a formula in W.R. Smythe "Static and Dynamic Electricity", third edition, Hemisphere, N.Y., 1989. The ohmic resistance has been calculated assuming the coil has been formed out of 14 gauge copper wire and assuming room temperature. The capacitance of the coil is based on an estimate.

It has been estimated that, detecting a resistivity anomaly up to 50 to 100 m away from the tool out in the formation using a transmitter coil and a receiver coil as the antennae, a magnetic moment of 50 A·m² in the transmitter coil and an effective area of 100 m² in the receiver coil would be sufficient. When fed with a DC current of 26 A, the magnetic moment of the coil as summarized in Table I is approximately 50 A·m². For the purpose of down-hole investigations, a magnetic moment of between 1 A·m² and 1000 A·m² has found to be generally practicable.

Moreover, for detecting the anomaly close by the tool, a turn-off time of 3 μs may be desired to be able to measure its electromagnetic properties without contribution from the transmitter coil still generating a field.

The snubber resistance and capacitance have been chosen to achieve a −80 dB attenuation of the current at 3 μs after opening the switch 8.

Figure 3A:
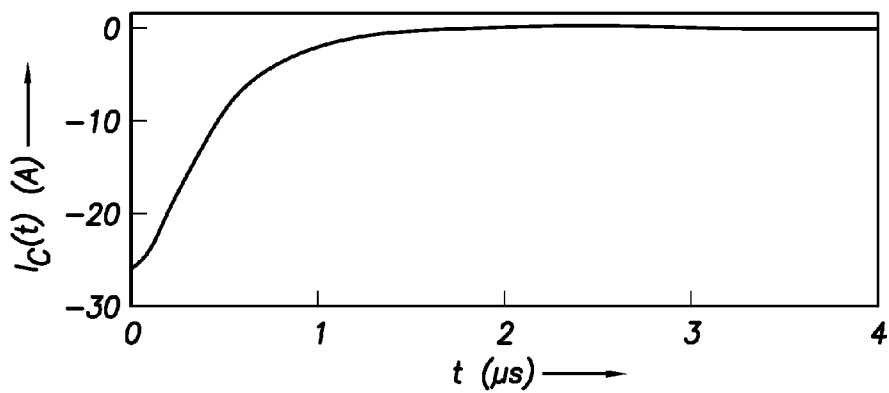
FIG. 3A shows a graph of calculated current $I_c(t)$ in the coil of FIG. 2A on a linear scale against time t following switching.
Figure 3B:
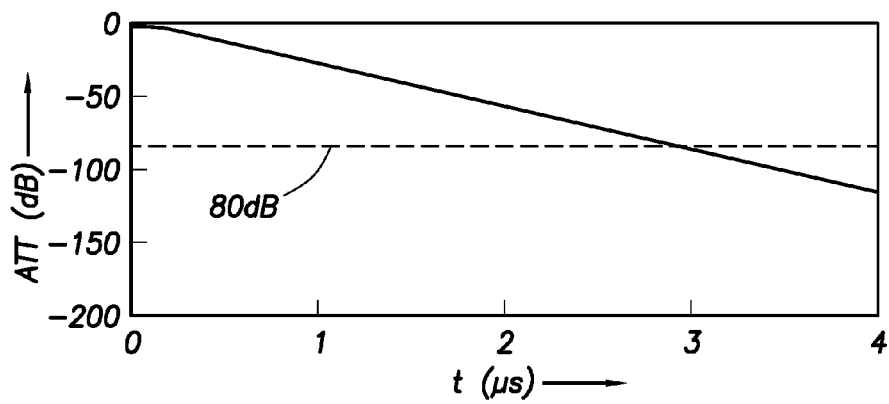
FIG. 3B shows the calculated attenuation of the current in the coil of FIG. 2A relative to the applied initial current against time.
Figure 4:
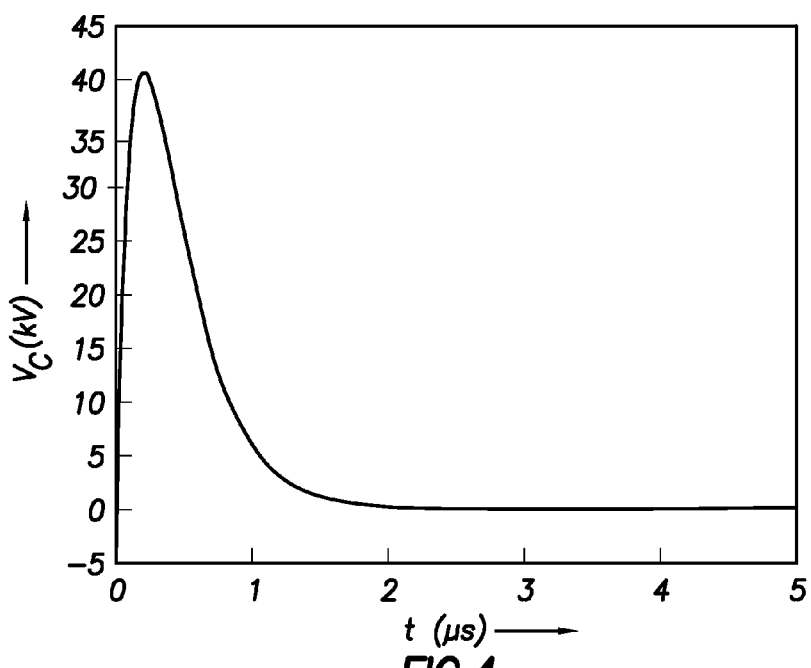
FIG. 4 shows a graph of calculated voltage $V_c(t)$ across the coil in FIG. 2A as a function of time t following switching.

FIG. 3A shows the calculated current $I_c(t)$ against time on a linear scale, while FIG. 3B shows the attenuation of the current relative to the applied initial current of 26 A. The dashed line corresponds to −80 dB attenuation, confirming −80 dB attenuation in 3 μs. The corresponding voltage across the coil, $V_c(t)$, is shown in FIG. 4. It reveals that switching at that rate results in a voltage spike in excess of 40 kV.

Back EMF may be reduced by decreasing the time derivative of the current (dI/dt) or the self-inductance L, or both.

Decreasing dI/dt would require a slower turn-off of the magnetic field, or starting at a lower current which would adversely affect the signal to noise ratio of the transient electromagnetic measurement because the signal is proportional to the magnetic moment which is proportional to initial current. A slower turn-off time would result in losing effective access to early-time transient response data reflecting the eddy currents in the formation because that would be overshadowed by the still emitting antenna.

The self-inductance of an air-core coil may be approximated by:

$$L \approx \mu_0 N^2 s/l, \quad (1)$$

wherein $\mu_0$ is the free-space magnetic permeability, N is the number of windings in the coil, s is the cross-sectional area of the air-core defined by the windings, and l is the length of the coil. At first glance, it appears that L can be reduced by simply decreasing N or s. However, that would also decrease the magnetic moment, m, of the transmission antenna, because the magnetic moment of a coil is given by:

$$m = N \cdot s \cdot I \quad (2)$$

As stated before, a sacrifice in magnetic moment effectively results in less ability to probe the formation far away from the tool. So in order to decrease N and/or s, an increase in current I would be necessary in order to maintain a selected magnetic moment. Another option may be to decrease N and increase s at the same ratio in order to preserve m. This would decrease L because of its quadratic dependence on N. However, this is generally not an option in situations where space is confined, such as in a bore-hole.

A solution to this problem of inducing a transient electromagnetic field in an object, is provided by dividing the inductive load into two or more inductive segments, each comprising a switch, in a vicinity of the object. The segments, such as grouped coil windings, may be aligned to cooperatively generate essentially a magnetic dipole field when the inductive segments are energized. The transient field is induced by terminating the energizing of each segment by operating each of the switches.

Figure 5:
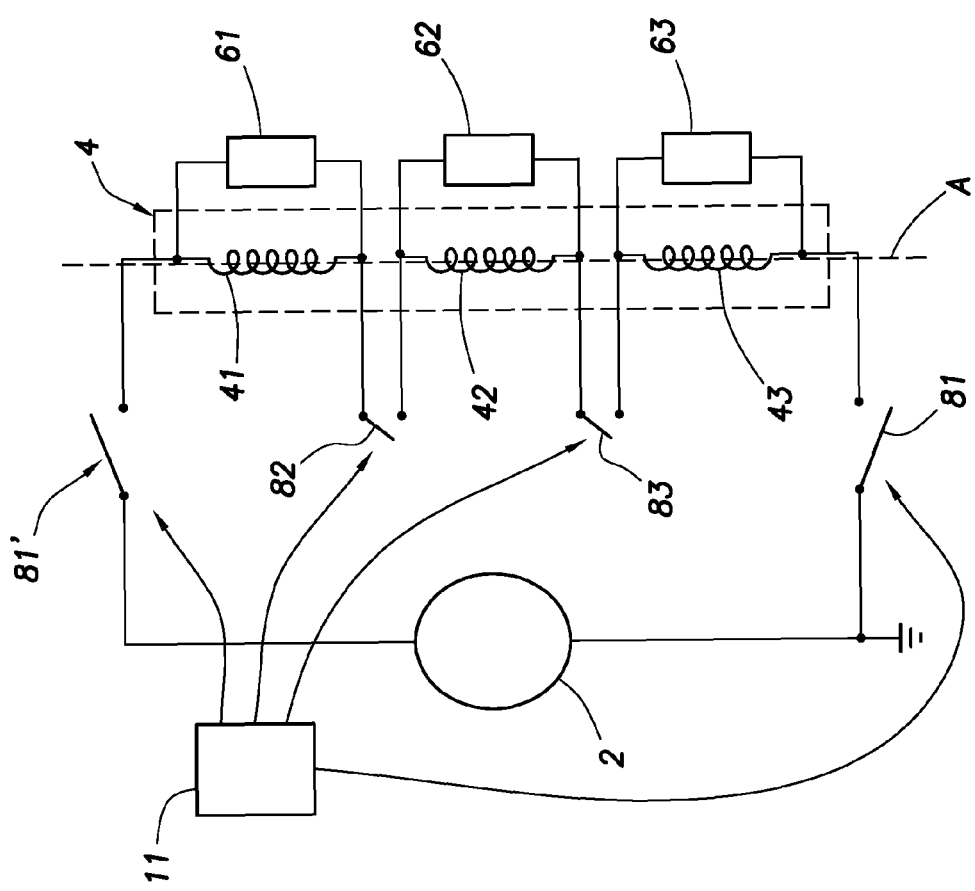
FIG. 5 schematically shows a segmented transmitter system connected to a power supply.

FIG. 5 schematically shows a transmitter system, wherein the inductive load 4 is provided in the form of two or more energizable inductive segments. In the embodiment of FIG. 5, the inductive load is provided in the form of coil 4 (similar to coil 4 of FIG. 2A), the windings of which have been divided into three groups of windings (unlike the coil 4 of FIG. 2A) to form inductive segments 41, 42, and 43. The groups of windings in the embodiment of FIG. 5 each are connected to a shunt circuit in the form of an optional snubber circuit 61, 62, 63, arranged in parallel connection to the respective groups of windings. The snubber circuit may damp an internal resonance of the group of windings.

In the present example, the windings of the coil 4 have been divided into three equal groups, but this is not a requirement of the invention. The division into groups may be into a different number of groups and/or the groups having mutually different numbers of groups of windings. For instance, in a co-axial arrangement of the groups of windings, a group that is centrally located relative to the other groups may need fewer windings in order to possess the same induction as the other groups.

The segments (groups of windings) 41 to 43 are connected in series with each other. Each segment also comprises a switch 81, 82, 83, in series with the segments.

The groups of windings 41, 42, 43, together with the switches, are series connectable with the power source 2 to energize them. An optional additional switch 81' is provided as well, in order to enable full isolation of each of the groups of windings from the power supply when energizing is terminated. If such an optional additional switch is provided, one of the switches may function as a primary switch and one as an auxiliary switch as will be further detailed herein below with reference to FIGS. 15A and/or 15B.

The switches 81, 82, 83, and in this embodiment also switch 81', are controlled by a common controller 11. The common controller 11 may be used to concertedly trigger switching of the switches 81, 82, and 83 into switching into their high-impedance state essentially simultaneously. Optional switch 81' may also be switched essentially simultaneously but that is not necessary. It may even be desired to purposely delay the switching of one of the switches into its high-impedance state for a certain period of time after switching the other switches.

When the switches are all in their conducting state, more generally stated their low-impedance state, the coil segments are energized by the power supply 2. The coil segments 41, 42, and 43 are arranged to cooperatively generate the essentially magnetic dipole field when energized. In the example, the coil segments are wound coaxially around a common axis A, and the current is directed in the same way such that the magnetic moments add up.

When all switches are open (non- or low conducting state), the groups of windings are electrically isolated from each other and from the power supply 2. The back-EMF voltage spike is thus divided over the coils/switches.

Figure 6:
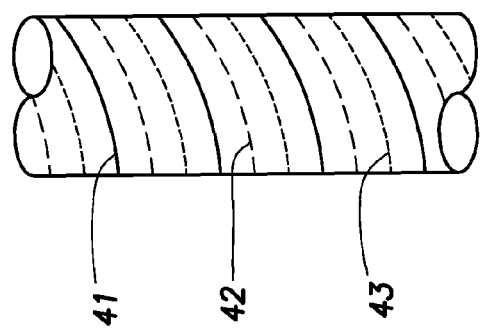
FIG. 6 schematically shows a view of helically wound groups of coil windings.

The coil segments 41, 42, 43 need only to be electronically separated from each other, not physically. The coil segments 41, 42, 43 may also be wound concentrically one on another, or as multiple helixes interlaced with each other, such as shown in FIG. 6. However, physical separation may be beneficial in that it reduces mutual inductance between the group of windings of the coil.

Generally, when a coil is divided into S segments, such as by dividing the number of windings into S groups of windings, the self-inductance of the total coil is the sum of the self-inductances of each segment and all the mutual cross inductances between the segments.

To demonstrate the utility of the transmitter system of FIG. 5, comprising the segmented coil, a calculation has been made for an inductive load in the form of 125-winding coil (corresponding to Table I) divided into equal segments. The total coil length remains the same, because the coil segments are abutting to each other. The self-inductance of each segment is approximately one fourth of the value of that of the total coil. The remaining one fourth arises from the mutual cross inductances between the segments. These follow from formulas known to the person of ordinary skill in the art. The ohmic resistance R of each coil segment is simply one third of that of the full 125 winding coil. The distributed capacitance C of each coil segment is more difficult to estimate. It will be assumed to be one third of the full value of Table I. This is not a crucial point, because the segment capacitance may be adjusted by adding a shunt in parallel.

Each segment further comprise a snubber circuit consisting of a resistor and a capacitor. An overview of the dimensions and parameters are given in Table II in respect of the segments.

TABLE II

| Parameter | value |
| --- | --- |
| segment diameter | 14 cm |
| Number of coil segments | 3 |
| Number of windings per segment | 42 |
| Pitch of windings | 2 mm |
| Axial length of each segment | 8.4 cm |
| Self-inductance in segment | 0.23 mH |
| Ohmic resistance of segment | 0.15 Ω |
| Distributed Capacitance segment | 17 pF |
| Snubber 61 Resistance | 900 Ω |
| Snubber 62 Resistance | 1000 Ω |
| Snubber 63 Resistance | 900 Ω |
| Snubber 61 Capacitance | 2 µF |
| Snubber 62 Capacitance | 2 µF |
| Snubber 63 Capacitance | 2 µF |
| Cross inductance segments 41-42 | 0.060 mH |
| Cross inductance segments 42-43 | 0.060 mH |
| Cross inductance segments 41-43 | 0.012 mH |
| Effective inductance segment 41 | 0.30 mH |
| Effective inductance segment 42 | 0.35 mH |
| Effective inductance segment 43 | 0.30 mH |

The effective inductances of each segment, being the self-inductance of the segment plus the mutual cross inductances arising from the other segments, have been calculated assuming that the currents in the segments are equal to each other. Thus, the voltage across each segment is the sum of the EMF plus $R \cdot I_c(t)$, whereby the EMF may be expressed as the effective self-inductance times the time derivative $dI_c/dt$ of the current $I_c(t)$ in the coil segment.

Since the total coil is essentially equal to the one of Table I, the same current of 26 A results in a magnetic moment of 50 A·m$^2$. The snubber parameters have again been chosen to achieve the 80 dB attenuation in 3 µs.

Figure 7A:
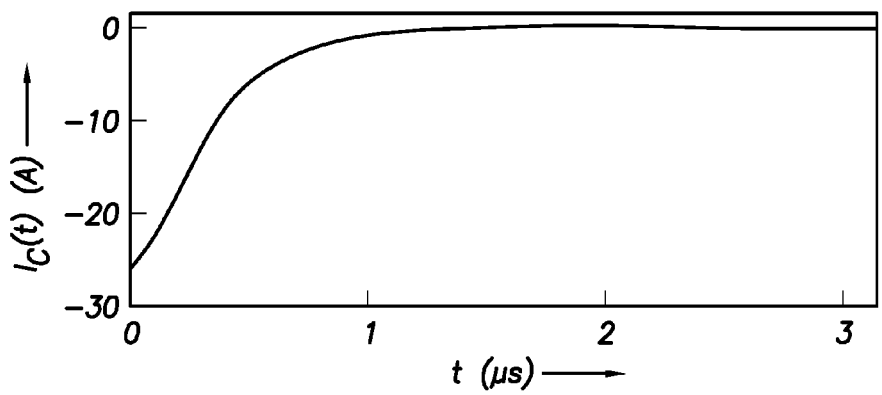
FIG. 7A shows a graph of calculated current $I_c(t)$ in each of the antenna segments of FIG. 5 on a linear scale against time t following switching.
Figure 7B:
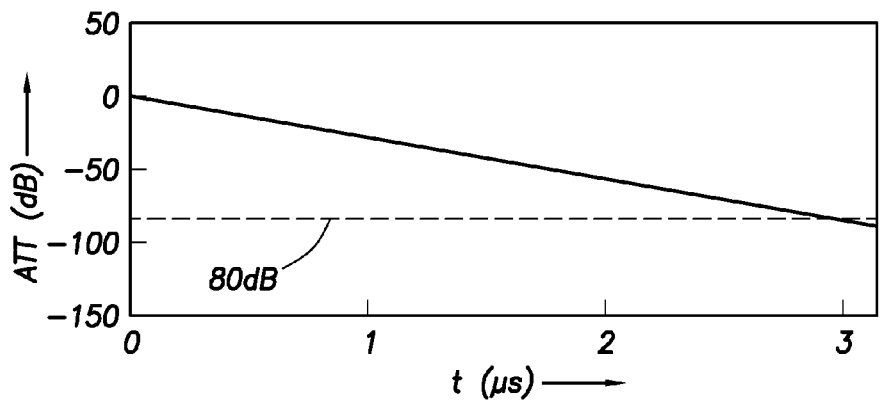
FIG. 7B shows the calculated attenuation of the current in each of the antenna segments of FIG. 5 relative to the applied initial current against time.

FIG. 7A shows the calculated current $I_c(t)$ in each coil segment, against time on a linear scale. The three curves in FIG. 7A overlap each other. In FIG. 7B, showing the attenuation of the current in each coil segment relative to the applied initial current of 26 A, it can be seen that the curves corresponding to coil segments 41 and 43 fully overlap, while coil segment 42 appears to turn off at a marginally slower rate.

Figure 8:
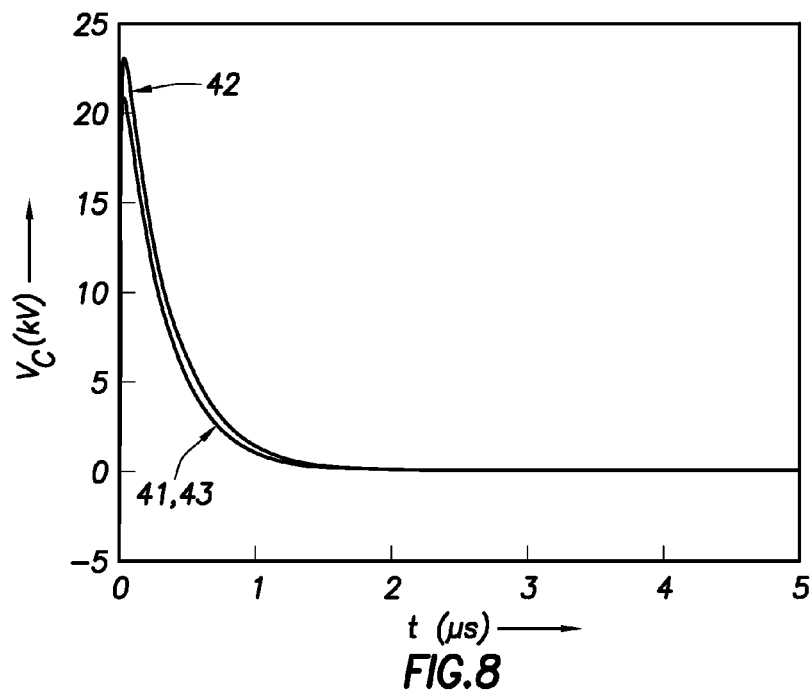
FIG. 8 shows a graph of calculated voltage $V_c(t)$ across each of the antenna segments of FIG. 5 as a function of time t following switching.

FIG. 8 shows the corresponding voltages across each coil segment. Using the design of the present example, the spikes still exceed 20 kV, but are approximately a factor of two lower than was the case with the equivalent coil 4 of FIG. 2A. This demonstrates that dividing the coil into two or more energizable segments arranged to cooperatively generate the essentially magnetic dipole field, whereby each segment comprises a switch capable of terminating the energizing whereby the segments are isolated from each other at least after termination of the energizing, offers an improvement over a single, undivided, coil.

By dividing the large coil into even more and smaller segments, the voltage across each segment, and therefore each switch, will be reduced. An example employing a coil divided into five segments will now be discussed.

Figure 9:
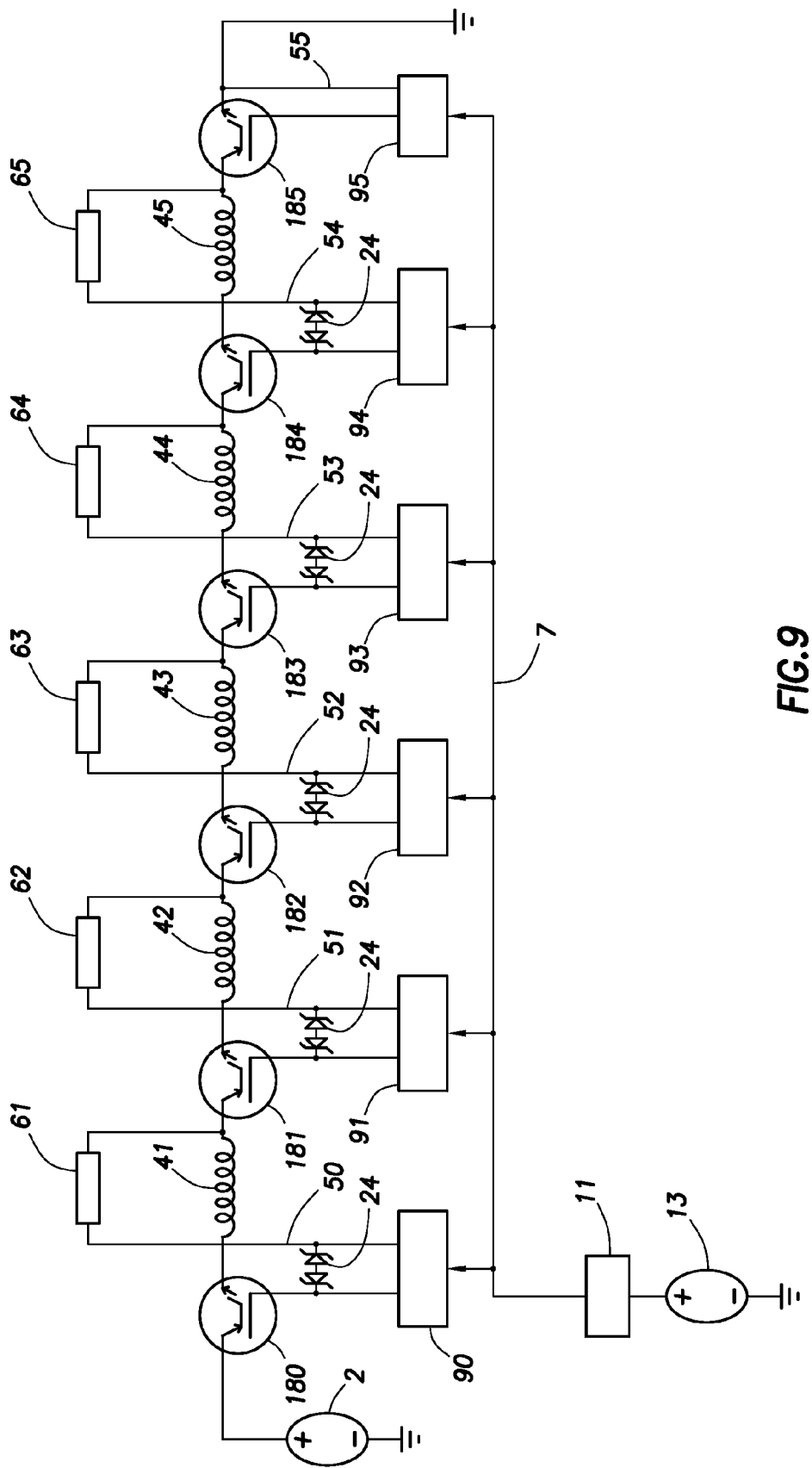
FIG. 9 schematically shows a model of a transmitter system comprising 5 groups of coil windings.

FIG. 9 shows a schematic model of a transmitter system comprising a power supply 2 and five inductive segments (41 to 45), switches (181 to 185) in the form of insulated gate bipolar transistors (IGBT) associated with each of the inductive segments, and an optional additional switch 180 to enable full isolation of all the inductive segments from the power supply 2 including segment 41. The optional additional switch may duplicate the function of the other switches, or it may function as an auxiliary switch, while the other switches 181 to 185 may function as primary switches, in accordance with the principle set forth hereinbelow with reference to FIGS. 15A and/or 15B. Alternatively, switches 180 to 184 may function as primary switches while the switch 185 that is closest to the power supply ground may function as an auxiliary switch.

An IGBT is one embodiment of a gate transistor. A common other type of gate transistor is a field-effect transistor (FET). A gate transistor may have a first and second terminals connected with each other via a gated channel. These terminals may be referred to with various terms, of which source and drain, collector and emitter, etc., are examples. The switching occurs between these terminals as a result of impedance changes in the gated channel, depending usually on gate potential relative to one of the first and second terminals (usually the drain or the emitter). A gate terminal is provided to regulate the gate voltage.

FIG. 9 further shows gate drivers 90 to 95 to control the voltages of the gates of the IGBT switches 180 to 185. The gate voltage of the IGBT must be controlled relative to the emitter voltage, and therefore the gate drivers are connected to their respective emitters via lines 50, 51, 52, 53, 54, 55, respectively, to act as "floating ground". The gate drivers may also comprise a voltage source relative to the floating ground to power the IGBT gate drivers 91 to 95.

Also shown in FIG. 9 are potential limiting circuits 24, arranged to limit a potential difference between the gate terminal and the emitter terminal of each of the switches 180 to 184. In the present case, using IGBTs, the gate-emitter potential determines whether the switch is open or closed. The potential limiting circuit 24 protects the respective switch against a to high potential difference, which could burn out the switch.

Here, the potential limiting circuit 24 is provided in the form of two Zener diodes arranged back-to-back such that they are blocking conduction between gate and emitter terminals. However the potential difference is limited to the Zener break down voltage. For this application, the Zener break down voltage is typically less than 20 V, for instance between 5 V and 15 V. We propose 12 V Zener diodes as they are cheap and effective. However, other active components may be used, such as avalanche diodes, or other potential limiting circuits 24 that may be devised by a person of skill in the art.

The switches 180 to 185, in the present embodiment, are mutually coupled via timing line 7 to allow essentially simultaneous switching of all the switches. The timing may be managed employing a microcontroller 11. A first power supply 2 provides power to the coil segments 41 to 45; a second power supply 13 provides power to the microcontroller 11.

A microcontroller 11 may be provided in any suitable form, including an analogue circuit, a microprocessor, a programmable microcontroller, a programmable interface controller (PIC), a digital signal processor (DSP).

The emitter of the IGBT 185 is connected to the same ground as power supply 2, but the emitter potentials at the IGBTs 180 to 184 may be subject to high back-EMF voltages imposed by the coil segments 41 to 45. In order to avoid these voltages to be connected to microcontroller 11, opto-coupling techniques may be employed. This will be illustrated with more particularity hereinbelow.

The coil segments 41 to 45 in the embodiment as depicted in FIG. 9 are axially separated from each other, providing room for the electronic components and to reduce the mutual cross inductances between the segments.

The transmitter system of FIG. 9 may operate as follows. The microcontroller 11 provides a timing signal on line 7. Alternatively, it could provide individual timing signals on individual lines leading to each driver 90-95. The timing signal is initially at ground, forcing the IGBTs 180 to 185 into their high-impedance state. No current is then flowing through any of the coil segments 41 to 45. The microcontroller 11 then transitions the timing signal from ground to a high-level, e.g. 5 V, preferably faster than the IGBT switching time, e.g. in less than about 100 ns. The timing signal is fed to the drivers 90 to 95, which react by supplying a drive voltage to the IGBT gates relative to the emitter voltage. The drive voltage is sufficiently high, typically higher than about 20 V, to bring the IGBTs 180 to 185 into a low-impedance state. The coil segments 41 to 45 begin to be energized as a result of current flowing through them. After about 15 ms, a steady state has been reached, and the timing signal transitions back to ground, causing the drivers 90 to 95 to reduce the drive voltage and the IGBTs 180 to 185 to return to their high-impedance state. The current in the segments 41 to 45 is then dissipated, assisted by the snubber circuits 61 to 65, until each coil segment 41 to 45 is switched off. A time-resolved transient electromagnetic signal may be recorded during the time that the IGBTs are in their high-resistance state.

This procedure may be repeated over and over again if desired.

The embodiment of FIG. 9 has been modeled, using the dimensions and properties as provided in Table III below:

TABLE III

| Parameter | value |
| --- | --- |
| segment diameter | 14 cm |
| Number of coil segments | 5 |
| Number of windings per segment | 20 |
| Pitch of windings | 2 mm |
| Axial length of each segment | 4.0 cm |
| Separation between segments | 5.0 cm |
| Self-inductance in segment | 0.076 mH |
| Ohmic resistance of segment | 0.072 Ω |
| Distributed Capacitance segment | 5 pF |
| Snubber Resistance all snubbers | 300 Ω |
| Snubber Capacitance all snubbers | 4.7 µF |
| Cross ind. adjacent segments | 9.3 µH |
| Cross ind. segm. spaced 1 apart | 2.1 µH |
| Cross ind. segm. spaced 2 apart | 0.75 µH |
| Cross ind. segm. spaced 3 apart | 0.33 µH |

The self-inductance and the distributed capacitance in the segments have been estimated, and the mutual cross inductances have been calculated. A so-called Simulation Program with Integrated Circuit Emphasis (SPICE) model has been employed to simulate the circuit as set forth in FIG. 9, which allows circumvention of the so-called effective self-inductance approximation as used above. An initial energizing with a DC current of 11 A was assumed, which results in a calculated total magnetic moment of 17 A·m².

Instead of assuming ideal switches, as was the case in the previous examples, realistic transistor switch properties were modeled. It was assumed the transistor switches are comprised of insulated gate bipolar transistors, known in the art as IGBT. Such IGBT may realistically have switching speeds of less than 1 µs, and relatively high breakdown voltage exceeding 1 kV.

Figure 10A:
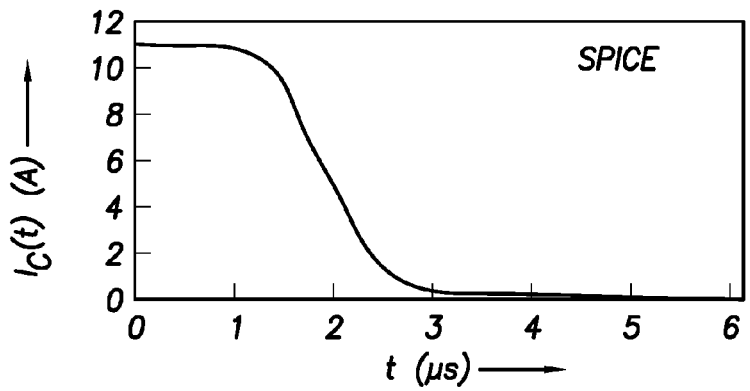
FIG. 10A shows a graph of calculated current $I_c(t)$ in each of the groups of windings of FIG. 9 on a linear scale against time t following switching.

FIG. 10A shows the absolute current in each of the coil segments 41 to 45 of FIG. 9 as modeled by SPICE, as a function of time after the IGBTs 180 to 185 have been switched to their high-impedance state. The absolute current curves of each coil segment 41 to 45 indistinguishably overlap on the scales as depicted. A delay of over 1 µs is observed after the transitioning of the timing signal to ground, before a noticeable decay is observed in the current. Such switching delays are believed to be inherent to IGBT switches, and depending on the type of IGBT the switching delay may typically amount to from between about 100 ns to about 1 µs. Such switching delays do not significantly affect the transition time of the electromagnetic field, but they merely delay the switching off of the electromagnetic field relative to the timing signal.

Figure 10B:
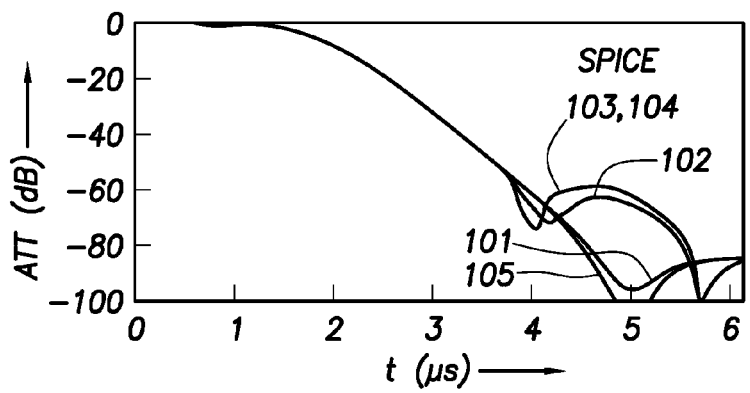
FIG. 10B shows the calculated attenuation of the current in each of the groups of windings of FIG. 9 relative to the applied initial current against time.

FIG. 10B shows the calculated currents of FIG. 10A, plotted as attenuation of the current relative to the applied initial current of 11 A. Line 101 corresponds to the first attenuation in the first segment 41, line 102 in the second segment 42, line 103 in the third segment 43, line 104 in the fourth segment 44, and 105 in the fifth coil segment 45. The ringing that occurs at times longer than 3.5 may be attributable to computational errors. However, it is credible that −80 dB attenuation is reached before the 6 µs mark for each of the coil segments 41 to 45, corresponding to a transition time of the magnetic field of less than 5 µs when disregarding the delay time.

Figure 11:
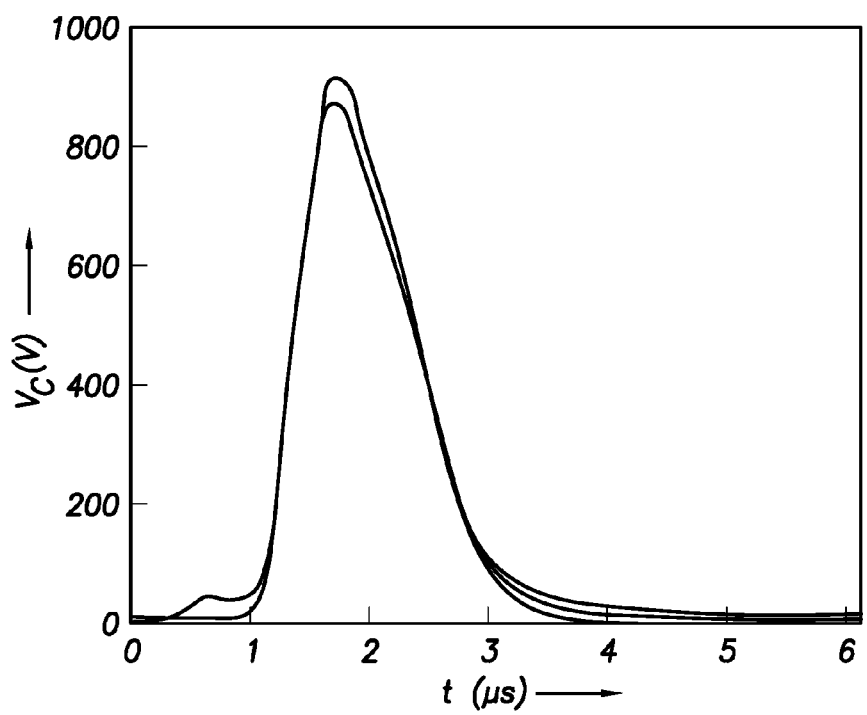
FIG. 11 shows a graph of calculated voltage $V_c(t)$ across each of the groups of windings of FIG. 9 as a function of time t following switching.

FIG. 11 shows the calculated voltage behavior across each IGBT 181 to 185. The peak voltage is around 900 V in respect of each of the IGBTs, which would be below the 1 kV specification of some commercially available IGBTs.

In the previously shown embodiments, the antenna segments (typically inductive segments) are connected in series, at least when being energized. However, the invention does not require the antenna segments to be connected in series. There are other classes of embodiments as will be set forth with reference to FIGS. 12 to 14.

Figure 12:
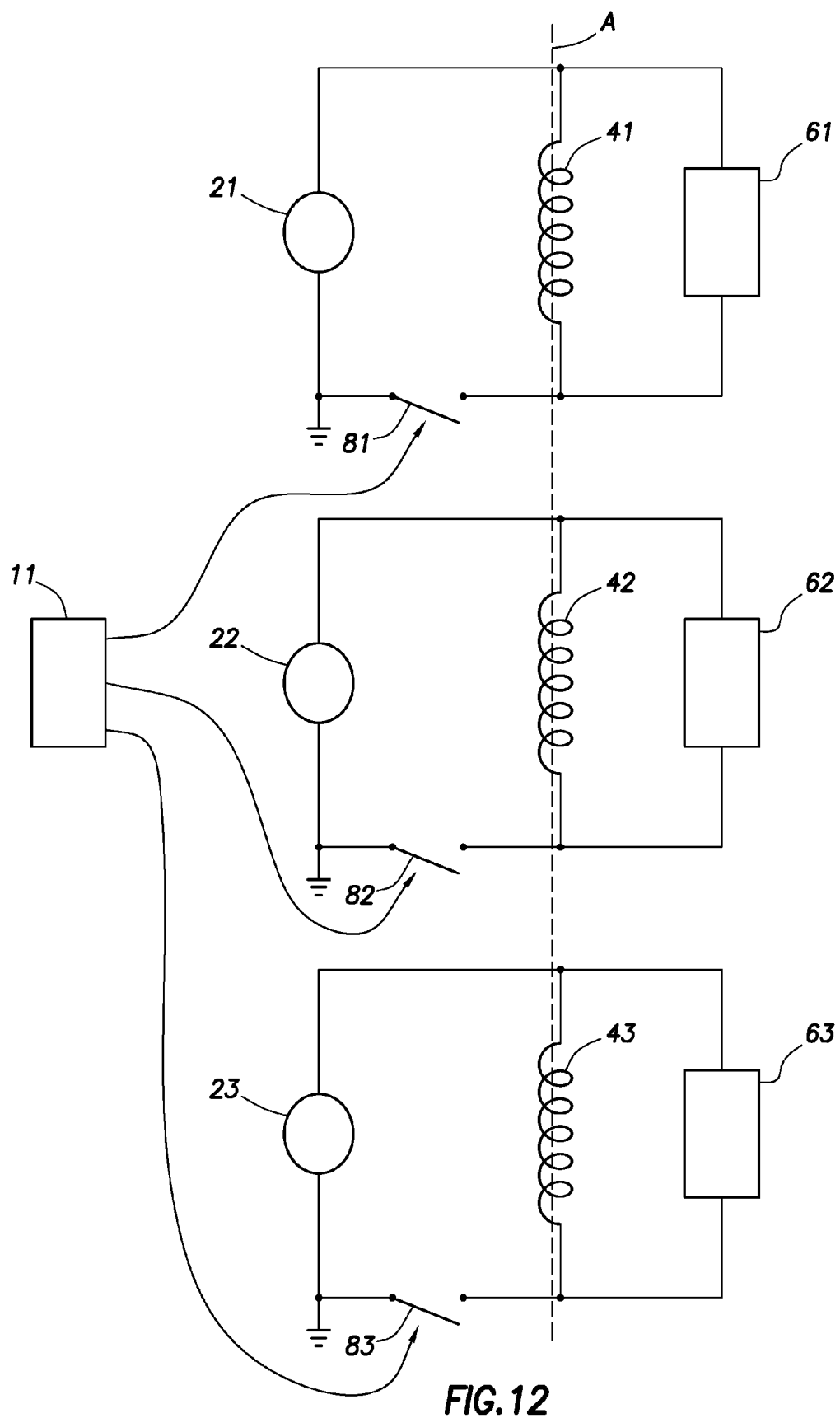
FIG. 12 schematically shows a transmitter system representative of a class of other embodiments.

FIG. 12 shows a transmitter system that is representative of a class of other embodiments, wherein the segments each comprise a dedicated power supply indicated at 21; 22; 23, respectively. Three axially aligned segments have been depicted, but any number of segments may be employed. Switches (81; 82; 83) have been arranged in series with each segment in order to enable disconnecting the coils 41/42/43 and snubbers 61/62/63 from the power supplies 21/22/23. Also shown is common controller 11. The operation of this class of embodiments is similar to the other embodiments. One difference is that, in this embodiment the coil segments are electrically isolated from each other not only when the energizing is terminated, but also during the energizing (except for common grounding).

In this class of embodiments, each of the switches may connect a group of windings to a common ground, which makes it relatively easy to reference a gate voltage for the switches to ground.

Figure 13:
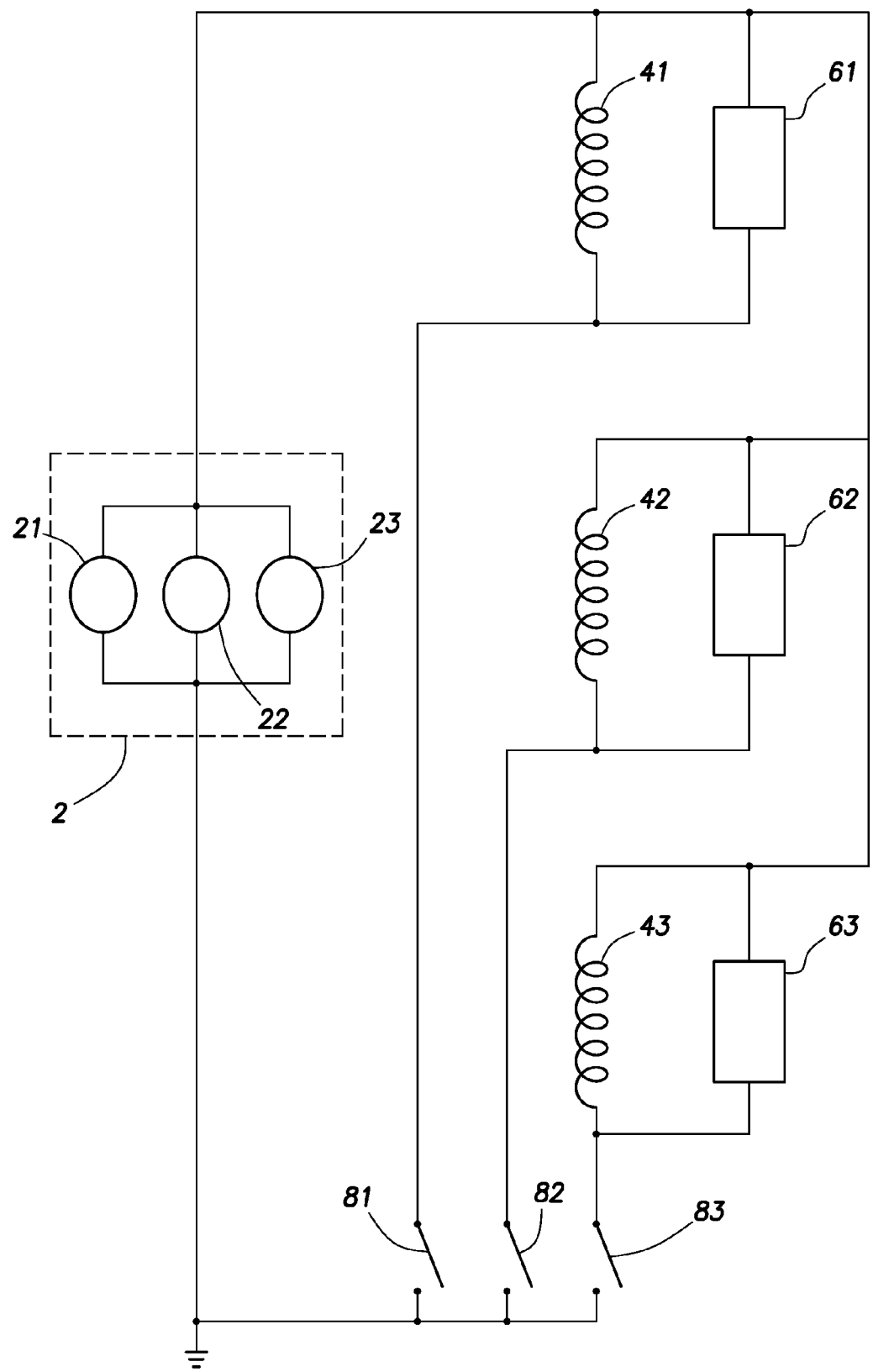
FIG. 13 schematically shows a transmitter system representative of another class of other embodiments.

Alternatively, any number of the segments of FIG. 12 may be connected in parallel to each other, and share a single power supply 2 as is illustrated in FIG. 13. However, that would require the power supply to generate a current corresponding to the sum of the required or desired currents through each of the parallel coil segments (41,42,43), which may in practice be less attractive. The increased current requirement of the power supply 2 has been schematically depicted in FIG. 13 by showing three parallel power supplies 21, 22, 23 internal to the power supply 2.

The switches 81, 82, 83 may all be advantageously referenced to a common ground.

Figure 14:
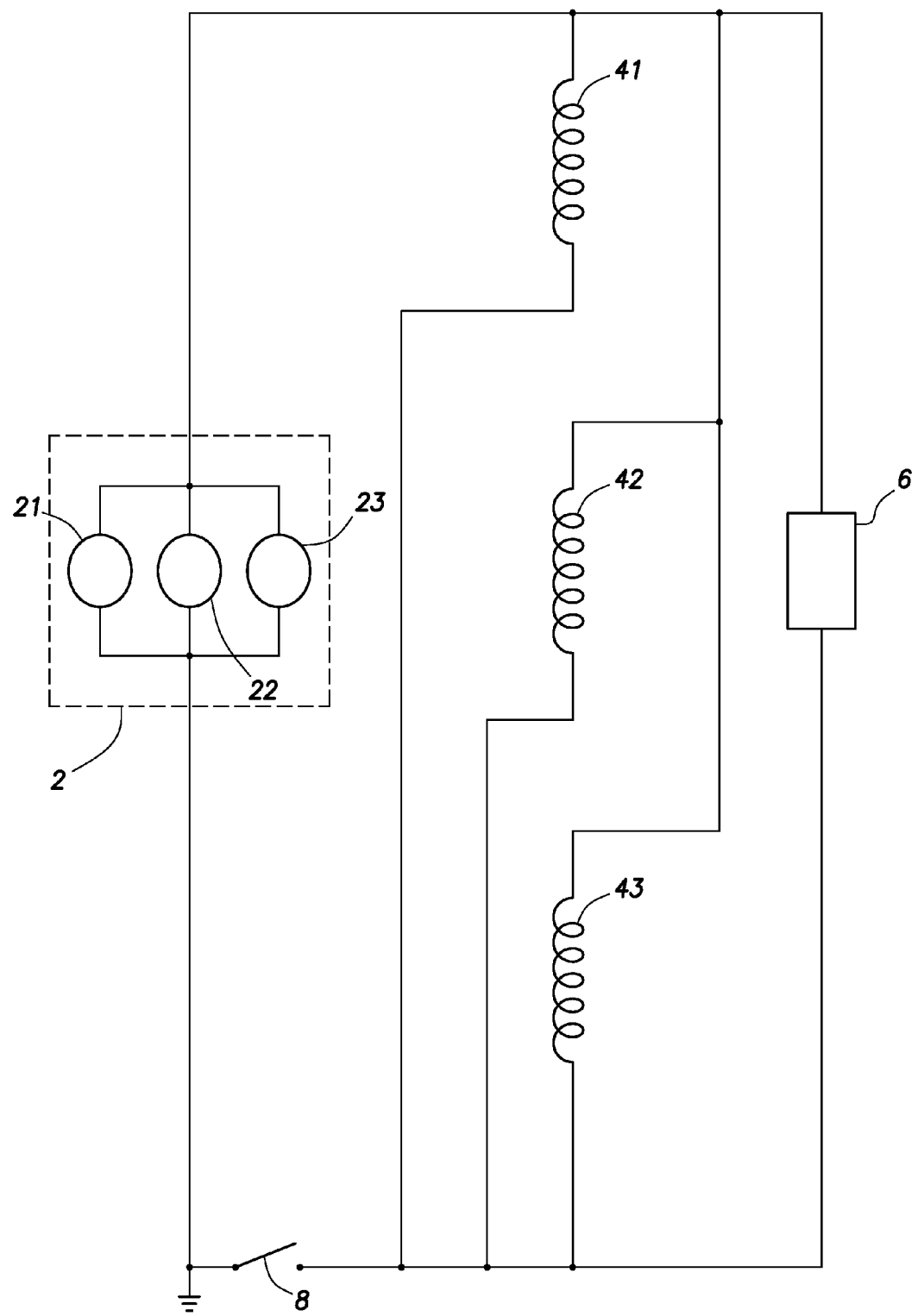
FIG. 14 schematically shows a transmitter system representative of still another class of other embodiments.

Since the current of several coil segments is collected, embodiments with parallel arranged coil segments also allow for a single switch 8 to terminate the energizing of all of the coil segments that are connected in parallel, as schematically depicted in FIG. 14. Of course, the switch 8 is preferably selected partly based on its ability to pass and switch high currents. Some IGBTs are specified at 70 A, which would practically allow approximately 3 parallel coil segments in a down hole tool for transient electromagnetic logging purposes. An optional snubber circuit depicted at 6 may be provided parallel to the coil segments, to damp coil induced resonances and oscillations. Since all the coil segments remain in parallel connection even after terminating the energizing, a single optional snubber circuit 6 shunting all coil segments could suffice.

The embodiments of FIGS. 13 and 14 may be combined. The switches 81, 82, 83 (each dedicated to a group of windings) could then for instance function as primary switches and the common switch 8 could then function as an auxiliary switch in accordance with the principles as will be set forth hereinafter with reference to FIGS. 15A and/or 15B, or vice versa.

Other combinations of the classes of embodiments in a single transmitter system are also contemplated.

A suitable IGBT for use as a switch in the present transmitter systems and applications is one from the so-called IXGH12N100-series (e.g. IXGK35N120BD1), which has a specified 1000 V breakdown at temperatures up to 150° C. Other IGBTs may have similar, better, or other acceptable specifications. A suitable gate driver may incorporate one from the IXDD409-series, or alternatively one of IXDD408, IXIXDD408, IXDI409, IXDN409, IXDD414.

However, alternative gate transistors exist that may be used. Generally, many types of field effect transistors (FET) are suitable. Typically, a metal-oxide-semiconductor FET (MOSFET) may be a faster type of gate transistor than an IGBT, but generally have lower breakdown voltage, on the order of a few hundred Volts, typically about 200 V, and/or a relatively high internal resistance which may cause a problem when energizing the antenna segments with high current.

In order to further speed up the turn-off and further increase the signal to noise ratio, each switch may comprise a primary switch and an auxiliary switch arranged in series connection with each other. This allows, for instance, the primary switch to be selected on the basis of its favorable breakdown properties (e.g. high breakdown voltage), and the auxiliary switch to be selected on the basis of other properties such as switching time and/or leakage current and/or tailing current.

Figure 15A:
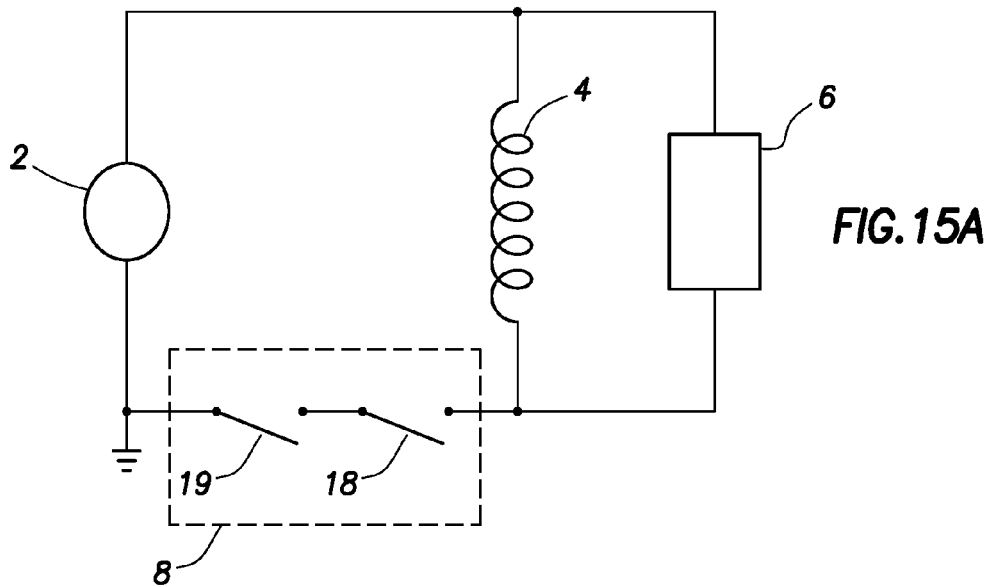
FIG. 15A schematically shows the coil system of FIG. 2A provided with a switching means comprising a primary switch and an auxiliary switch.
Figure 15B:
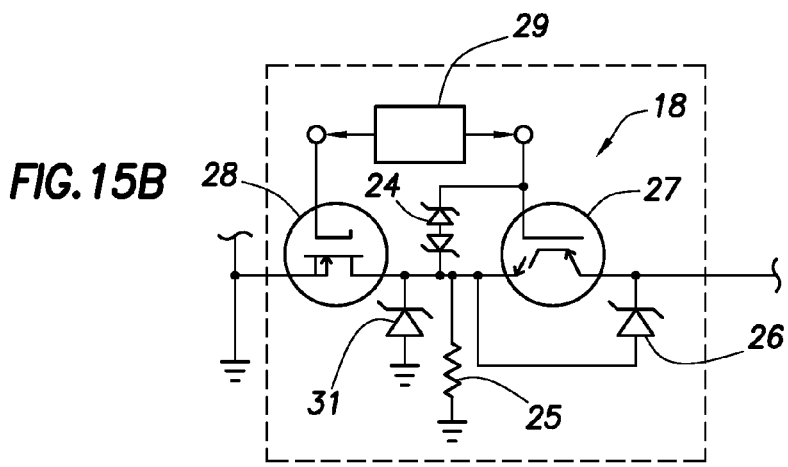
FIG. 15B schematically shows a switching system suitable for use as the switching means in the embodiment of FIG. 15A.

An example is shown in FIG. 15A, for a single coil 4 with optional snubber 6, basically corresponding to what was modeled hereinabove with reference to FIGS. 2-4. However, in this case, the switching means 8 comprises primary switch 18, which may be provided in the form of an IGBT 27 as shown in FIG. 15B, and auxiliary switch 19, which may be provided in the form of a MOSFET 28 (also in FIG. 15B), all in series with the power supply 2 and the coil 4.

The gate terminal of IGBT 27 is connected to the emitter terminal via potential limiting circuit 24. The functionality of such potential limiting circuit 24 has been explained above with reference to FIG. 9.

It has been found that an IGBT with a high break-down voltage, which as explained above is useful when dealing with a relatively high back-EMF voltage, could exhibit a relatively fast initial turn-off time but it may also suffer from a tailing current that may persist up to hundreds of microseconds. Such a tailing current may be relatively small compared to the initial current, but it may still adversely affect the signal to noise ratio of a transient electromagnetic logging tool since the transient response signals from the earth formation after a few hundred microseconds is also expected to be very small.

The auxiliary switch 19 may be used to shut off the tailing current from any IGBT switching one or more coil segments. As a result, the signal-to-noise ratio may be improved. In order to protect the auxiliary switch from exposure to excess voltage exceeding its break-down voltage during turning-off, the auxiliary switch may be kept into its low-impedance (resistance) state for a duration of time after bringing the primary switch into its high-impedance state before the auxiliary switch is brought into its high-impedance (resistance) state. In other words, a certain delay time may be applied for switching the auxiliary switch.

In practice, this may be accomplished by providing delay circuitry 29 arranged to delay the switching of the auxiliary switch 19 relative to the switching of the primary switch 18. For instance, the primary switch 18 may be coupled to a primary switch controller for controlling the switching of the primary switch, and the auxiliary switch 19 may be coupled to an auxiliary switch controller for controlling the switching of the auxiliary switch, wherein the auxiliary switch controller may be coupled to the delay circuit 29.

The delay time may be selected to be long enough for any back-EMF voltage to fall to a level below a predetermined value. The predetermined value may be selected such that there is no danger of exceeding the break-down voltage of the auxiliary switch. For instance, when the auxiliary switch is a MOSFET and the voltage spike is like the one shown in FIG. 4, the required delay time may be found by finding the time that it takes for the voltage to drop below the break-down voltage of the MOSFET. If that is 200 V, which is quite typical for a MOSFET, the delay time may be chosen at 1.2 µs or longer.

More generally, if the breakdown voltage for a specific switch would be $V_b$, a minimum delay time may be found in the voltage $V_c(t)$ behavior after switching the primary switch to its high impedance state by finding the time $t_{delay}$ after switching of the primary switch at which the back-EMF voltage induced in the coil has decayed to below $V_b$.

Feedback and control means may be provided, arranged to control the switching of the auxiliary switch in response to a signal representing actual back-EMF voltage generated in the inductive element as a function of time, at times after switching of the primary switch. For instance, a signal representing the voltage $V_c(t)$ of FIG. 2 could be used as the feedback signal in order to generate a trigger signal or a gate signal that triggers or results in the switching of the auxiliary switch.

The delay time may thus be made dependent on the decay of the back-EMF voltage. Alternatively, the delay time may be predetermined, for instance such as to achieve a desired target turn-off time. When a certain attenuation of current is desired in a certain time, the delay time may be chosen at the desired time minus the specified switching time of the auxiliary switch. For example, when a −80 dB attenuation in 3 µs desired, the delay time may be predetermined at anywhere between 0.1 µs and 3 µs, or for more typical back-EMF voltage spikes, between 1 µs and 3 µs.

There are numerous other ways to implement delay circuitry, including using a digital signal processor (DSP) with a timer or a clock and any suitable type of controller or microcontroller such as a programmable interface controller (PIC).

The use of the delayed auxiliary switch as set forth above is applicable to switching of coil segments (e.g. as shown in FIGS. 5, 9 and 12-14, as well as to switching of undivided coils (e.g. as shown in FIG. 2A).

FIG. 15B also shows optional shunts comprising Zener diodes 26 and 31. Zener diode 26 directly connects the emitter of IGBT 27 to its collector and Zener diode 31 connects the source to the drain of MOSFET 28. More generally, the diodes are connected in parallel to the primary and/or auxiliary switches and schematically represent optional protection circuits, which protect the switches against excess voltage. In reality, a number of Zener diodes, or other non-linear components, may be used in series. The concept will be described in more detail below with reference to FIGS. 17-22.

Resistor 25 in FIG. 15B may be provided to keep the emitter of the IBGT close to ground, to ensure that the gate voltage can be set relative to ground. However, there are other ways of referencing the gate voltage. An example will be given below.

As will be explained in more detail now, the voltage spike may be further reduced by different adaptations of the snubber circuit shunting the coil segments. This may enhance both the turn-off time of the transmitter system and the signal-to-noise ratio. For instance, the attenuation of the current in the above cases was found to be (nearly) exponential. This results in a relatively high peak voltage as at early times the time derivative of the current is relatively high. Ideally, the attenuation of the current is linear in time, and consequently a snubber circuit is preferably arranged to impose a linear attenuation of the current.

This may be achieved by a different design of the snubber circuit. For instance, the snubber circuit may comprise an active element, for instance, a transistor, a diode, a Zener diode, an avalanche diode, or a varistor.

Figure 16:
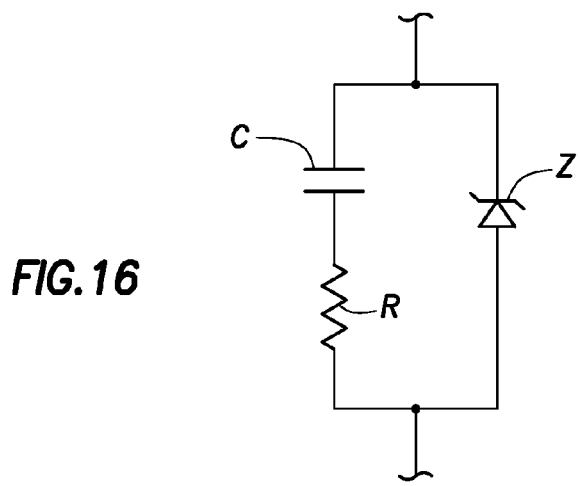
FIG. 16 shows an alternative snubber circuit employing a Zener diode.

FIG. 16 shows an example of such a snubber circuit, comprising a Zener diode Z connected in parallel to a capacitor C and resistor R.

It is also contemplated to provide a protection shunt circuit parallel to the switch(es). This has already been introduced briefly above, with reference to FIG. 15B. Like the snubber circuit on the coil segments, parallel to the inductive segment, such a protection circuit may comprise an active element, for example a diode, a varistor, a Zener diode or an avalanche diode, to protect the switch against excess voltage. The principle is that the switch is bypassed by a path which has an effective impedance that decreases with potential difference. Such a non-linear component ensures that the switch is protected against an excess voltage. A number of such active elements may be connected in series in order to divide the voltage drop over the number of elements. Oscillations may not be an issue in the switches, in which case the protection circuit may consist of only the active element(s). Some gated transistors have such a protection shunt built-in, in which case an additional protection shunt may be redundant.

Figure 17:
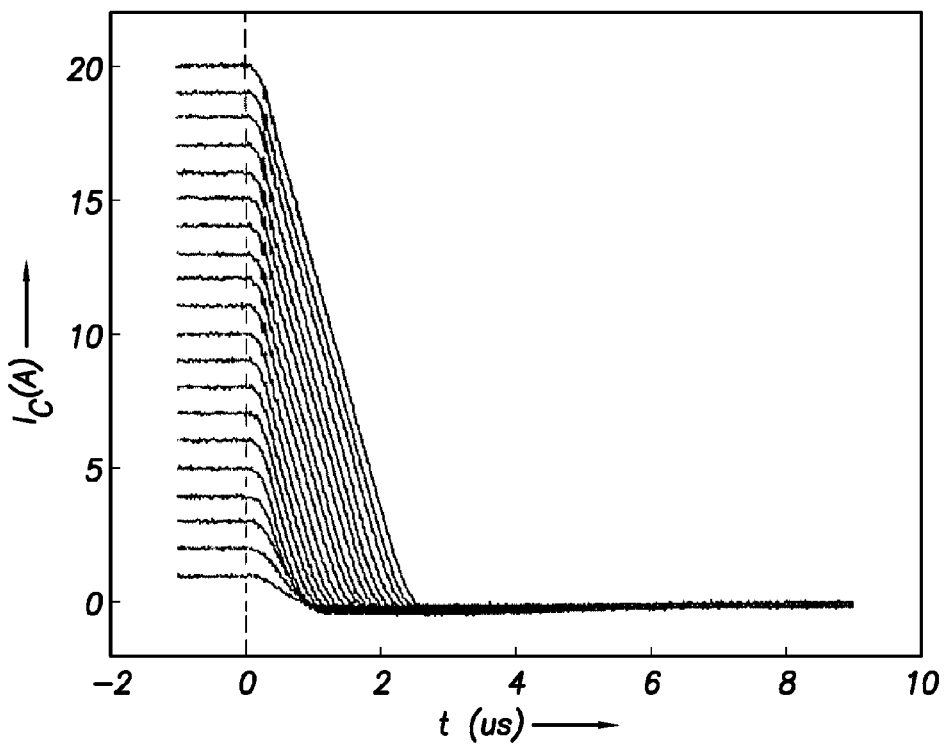
FIG. 17 shows measured current against time of a 50 winding coil switched by a 1200 V IGBT protected by a protection circuit comprising a series of Zener diodes arranged parallel to the IGBT.

FIG. 17 shows measured current against time after switching the power supply off from a 50 winding coil using a 1200 V IGBT switch protected with a shunt protection circuit comprising a number, in this case 5, of series-connected 200-V Zener diodes (series PK-1N6303A, type 1.5KE200A, commercially available from On Semiconductor of Houston, Tex.) in parallel to the switch, and in blocking orientation relative to the anticipated back-EMF polarity. Various initial currents from 1 to 20 A with 1 A increments have been employed, as indicated by the horizontal plateaus at times below 0. Starting at about 5 A, it can be seen that the current decay has a significant linear temporal behavior, representing a maximum decay rate for a given voltage limit. The maximum ceiling value of the decay rate is equal for each initial current. Hence the switching time depends on the initial current. However, even for 20 A the switching time was within 3 µs.

Figure 18:
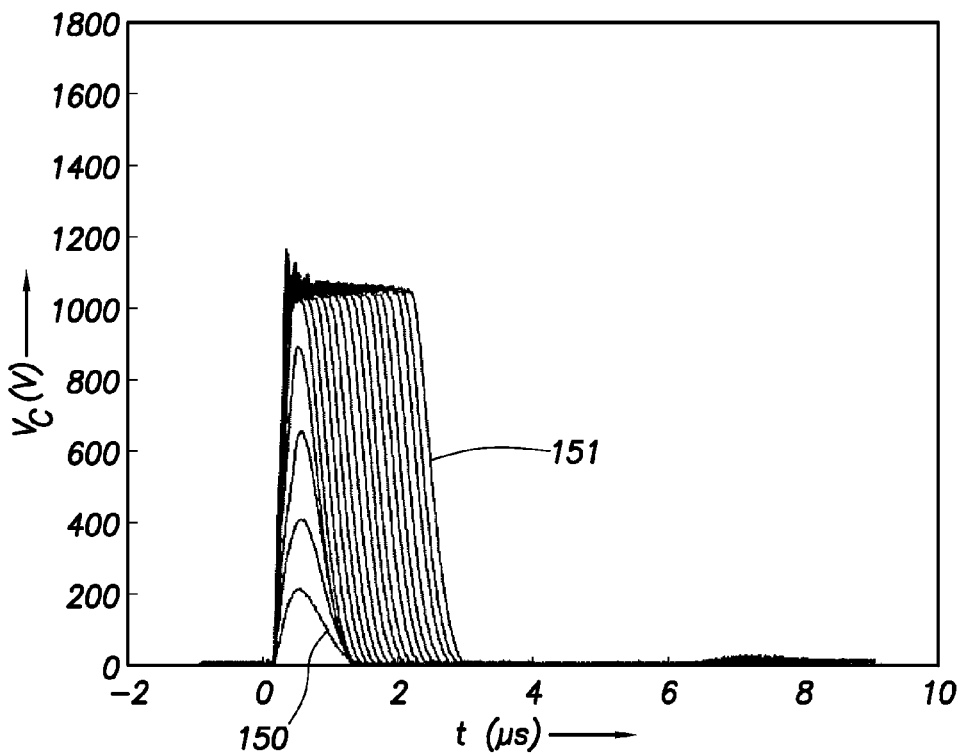
FIG. 18 shows measured voltage across the IGBT of FIG. 17.

FIG. 18 shows the voltage across the switch against time, whereby curve 150 corresponds to the data taken using an initial current of 1 A and curve 151 corresponds to the data taken using an initial current of 20 A. It never exceeds 1.1 kV, which reflects the break down voltage of the particular string of five 200-V Zener diodes in use. When the back-EMF is higher than the Zener break down voltage, the Zener diodes start conducting current to keep the voltage at a constant value.

Figure 19:
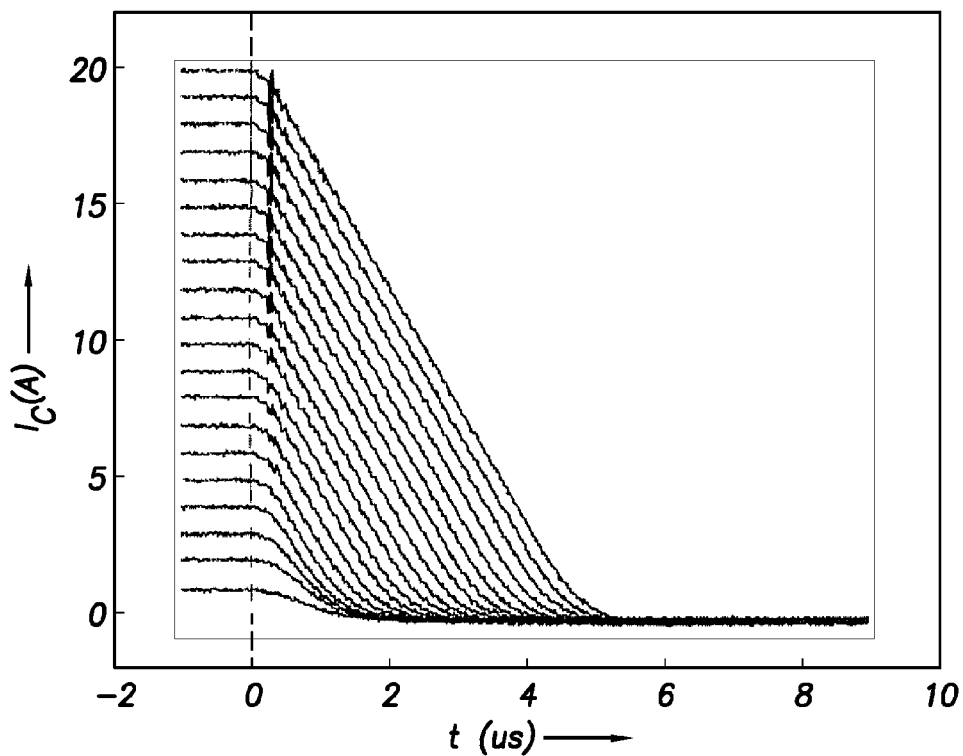
FIG. 19 shows measured current against time of a 100 winding coil switched by the same IGBT and protection circuit as used for the 50-winding coil of FIG. 17.
Figure 20:
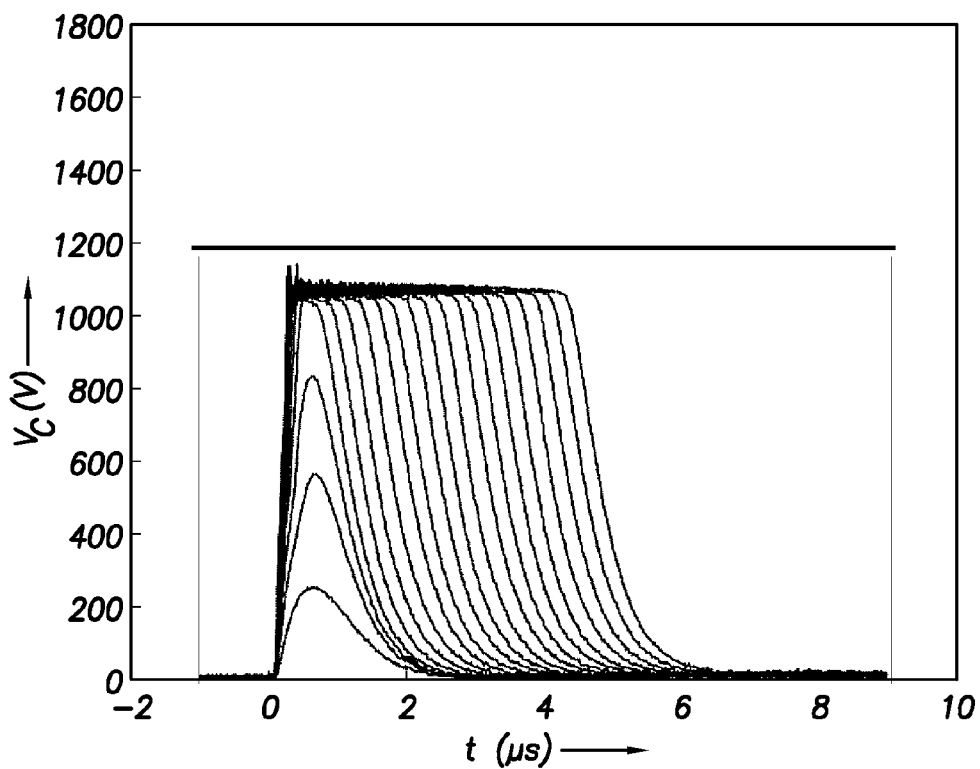
FIG. 20 shows measured voltage across the IGBT of FIG. 19.
Figure 21:
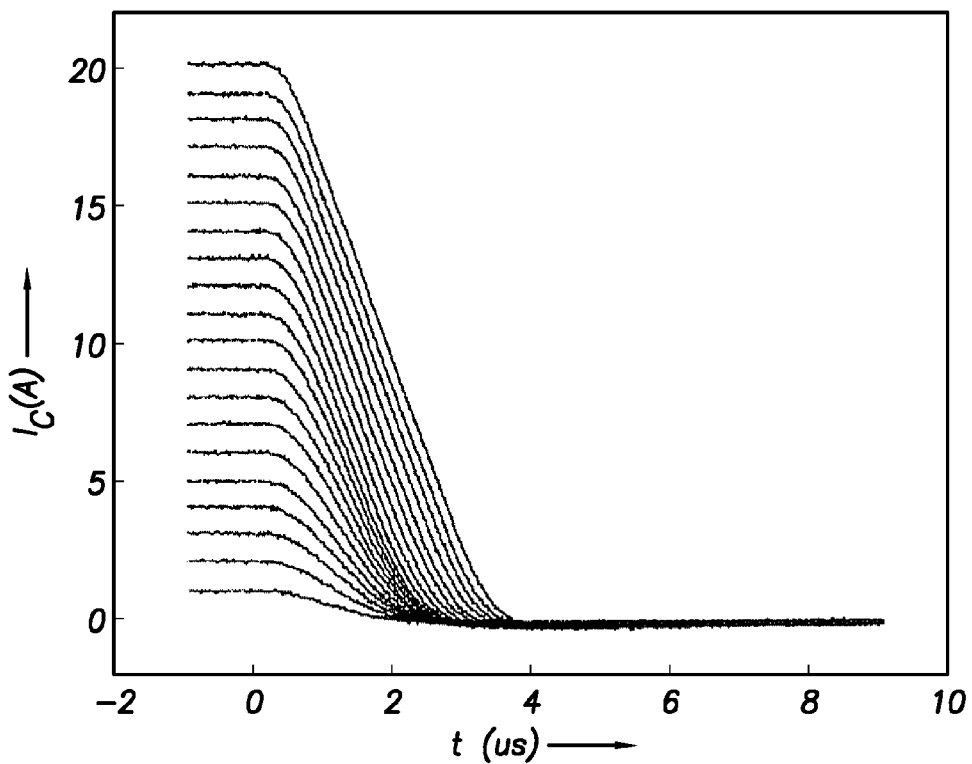
FIG. 21 shows measured current against time of the 100 winding coil of FIG. 19 switched by a 1700 V IGBT protected by a protection circuit comprising two Zener diodes.
Figure 22:
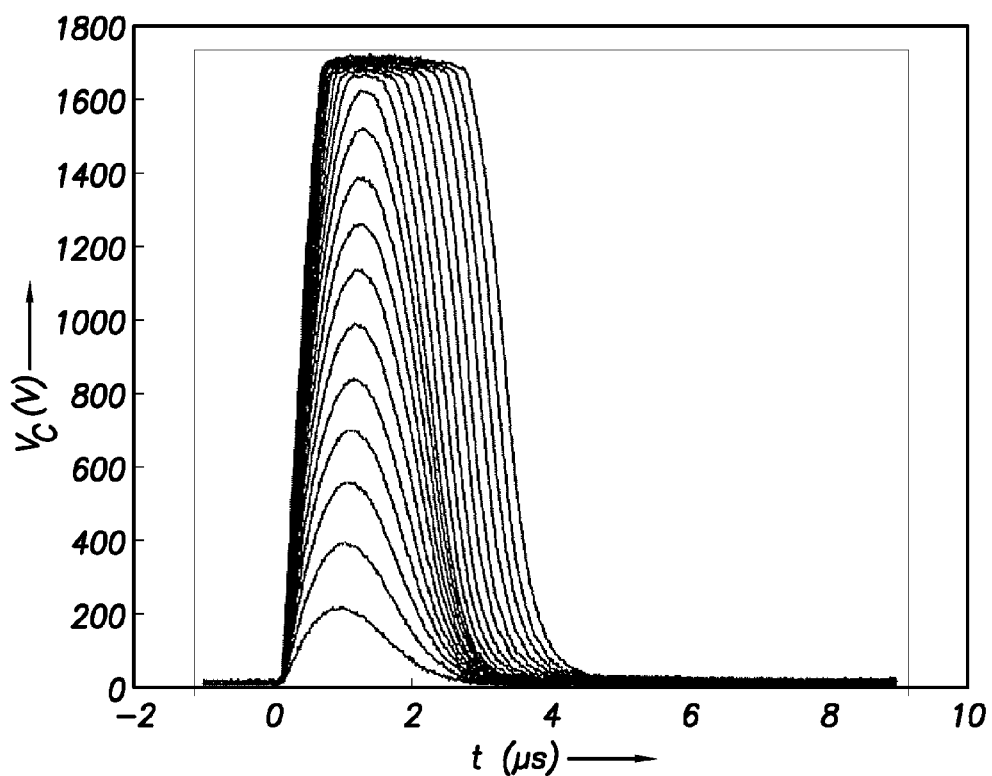
FIG. 22 shows measured voltage across the IGBT of FIG. 21.

FIGS. 19 and 20 present similar data as FIGS. 17 and 18, but using a 100 winding coil instead of a 50 winding coil. The switching times increase relative to the 50 winding coil. FIGS. 21 and 22 show similar data as FIGS. 19 and 20, employing the 100 winding coil, but using a 1700 V IGBT instead of a 1200V one. The number of (200-V) Zener diodes in string in the protection circuit was 8. The higher tolerance on the back-EMF peak voltage brings the switching times down.

The embodiments exemplified with reference to FIGS. 5 and 9 comprise switches (e.g. switches 82 and 83) that are not commonly grounded to the ground to which power supply 2 is grounded. This may be taken into account when referencing a gate voltage.

This problem may be solved by referencing the ground connection of the upper switches (upper switches are those that do not reference to the common ground) to a separate ground from the main power supply 2. An example of how this may be done is schematically depicted in FIG. 23.

Figure 23:
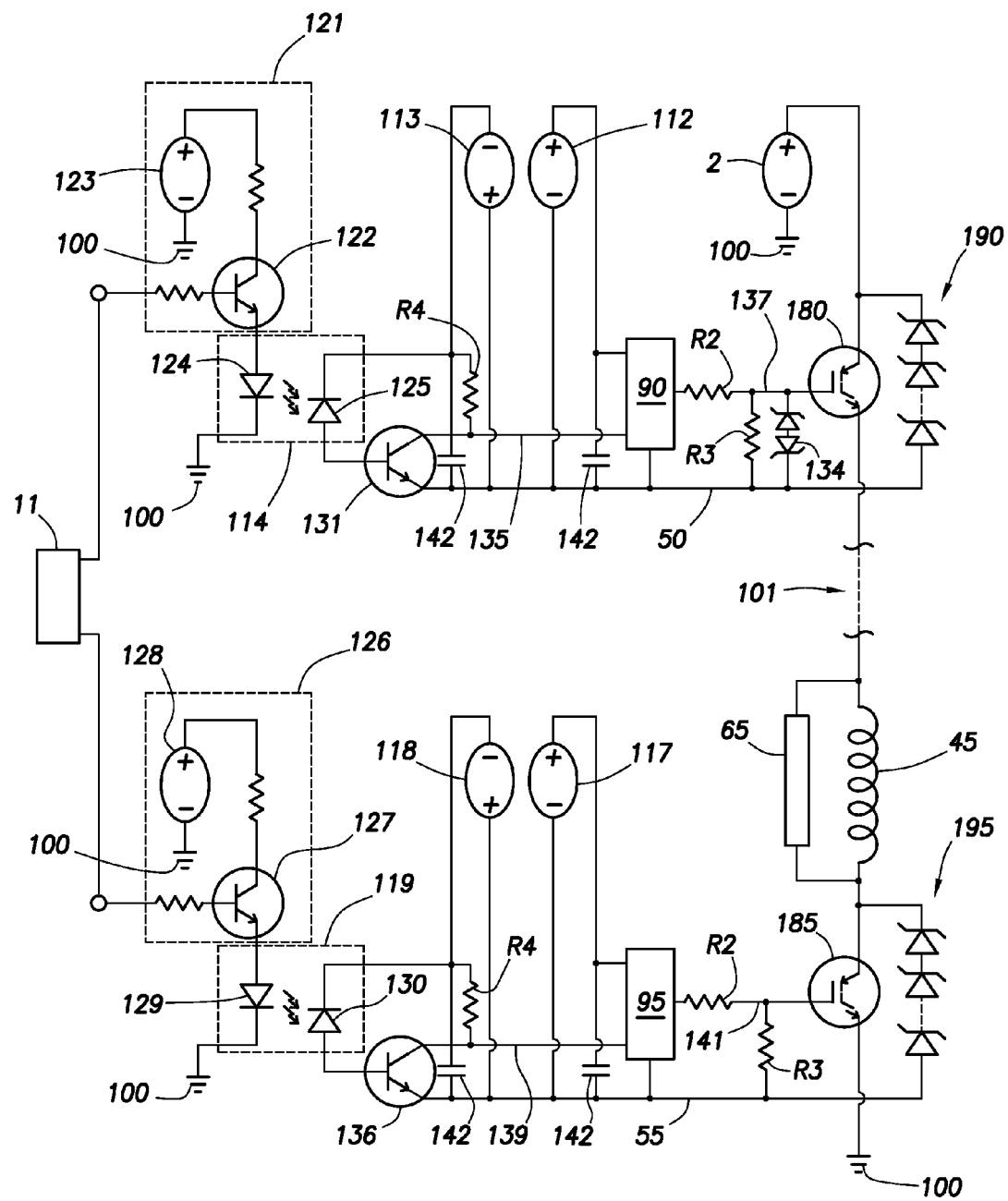
FIG. 23 schematically shows an embodiment employing an opto-coupler.

FIG. 23 shows coil segment 45, corresponding e.g. to the coil segment of FIG. 9 that is connected to the common ground 100 via switch 185, hereinafter referred to as the lower switch 185. FIG. 23 also shows the switch 180 that is connected to the main power supply 2. This will be referred to as the upper switch 180.

Any number of additional coil segments, with additional switches, may be provided between coil segment 45 and upper switch 180, as schematically indicated at 101. Or upper switch may be directly connected to coil segment 45, and/or coil segment 45 may be a full, undivided coil. The principles that will be set forth also apply for switch 180 if there would be another coil segment provided between the collector of switch 180 and the main power supply 2, such as is the case for instance with respect to switch 181 in FIG. 9.

An optional snubber circuit 65 is depicted connected in parallel with the coil segment 45. Optional switch protection circuits 190 and 195 have been depicted connecting emitter and collector of switches 180 and 185, respectively. More details have been provided hereinabove.

Still referring to FIG. 23, the gate voltage of the lower switch 185 is referenced to the potential in line 55, which is connected to the common ground 100. The electronics driving the gate of upper switch 180, including power supplies 112, 113 and gate driver 90 are referenced to the potential in line 50 which is connected to the emitter of the upper switch 180 and acts as a "floating ground" as soon as the lower switch 185 is open. As a result, the gate voltage of upper switch 180 is referenced to the emitter of upper switch 180.

The potential of the "floating ground" relative to the common ground could be quite high, and variable, as a result of back-EMF induced by the coil segments, when the switches are opened. The embodiment of FIG. 23 provides an opto-coupler 114, to electrically isolate other controller electronics (including, e.g., microcontroller 11 of FIG. 9) from the floating ground. Such an opto-coupler is also shown at 119 for the lower switch, as an option.

An opto-controller essentially comprises a controllable light source, here shown in the form of a light emitting diode (LED) 124, 129, in optical communication with a light detector, where shown in the form of a photo-diode 125, 130. The LED and photo diode may be in each other's near vicinity, such as integrated on the same circuit board or micro-electronic chip, or at remote distances with a light-conducting medium between them such as an optical fiber, or in any other configuration. A suitable integrated opto-coupler is available as part number PS8601.

If the microcontroller 11 cannot source enough current to drive the opto-controllers, an intermediate switch 121, 126 may be provided in between. Such intermediate switch may be provided in the form of a relay, an amplifier, a switching transistor or other suitable arrangement. Here, as an example, the intermediate switch is provided in the form of a switching transistor 122, 127, the base thereof being connected to the microcontroller 11 output, via for instance a resistor, and an amplifier power supply 123, 128. The amplifier power supplies may be provided in the form of one power supply supplying the power for all or a plurality of the amplifiers 121, 126. This way, light generation in the LEDs 124, 125 may be activated using the microcontroller 11.

The photo diodes 129, 130 are arranged to activate another intermediate switch, here provided in the form of a second switching transistor 131, 136 arranged to be biased by the photo diode 129, 130 in combination with a power supply 113, 118. Lines 135 and 139 connect the second switching transistor 131, 136 to their respective gate driver 90 and 95, which are powered by power supplies 112 and 117, respectively. The gate drivers 90, 95 put the gates of switches 180 and 185 on a controlled voltage referenced to lines 50, 55.

A resistor $R_4$ may be provided between each of lines 135 and 139 and their respective power supply 113 and 118.

An optional voltage divider, e.g. consisting of two resistors $R_2$ and $R_3$, may also be provided between the gate driver 90, 95 the switches 180, 185 and the floating grounds 50, 55 if needed, e.g. to enhance stabilization. Typically, one might choose $R_3 \gg R_2$, e.g. $R_3$ is a few k$\Omega$ and $R_2$ a few $\Omega$.

Also, a potential limiting circuit 134 may be provided to ensure that the potential difference between the gate terminal 137 and the emitter terminal of the IGBT 180 stays within a window set by the circuit.

In operation, a low pulse from the microcontroller causes the transistor 122, 127 to switch on and activate light generation in the LED 124, 129. The collector of the second switching transistor 131, 136 thus goes high for the duration of the initial low pulse from the microcontroller 11, turning the respective gate 137, 141 of the IGBT 180, 185 on for the duration of the in initial low pulse. This brings the switches into their low-impedance condition and the coil segment 45 is energized at a level determined by the current delivered by the main power supply 2. The output of the microcontroller 11 is then brought to high, turning the IGBTs off and thereby creating the transient electromagnetic field. A transient response signal may be recorded at this time.

The operation may be repeated over and over again for as long as desired.

Optional capacitors 142 may be provided through-out, to bleed off any AC components from the circuitry to the floating ground. Their capacitance values would be easy to determine based on the specific characteristics of an embodiment.

Finally, it is remarked that either one of the two switches 180, 185 shown in FIG. 23 may be chosen to function as an auxiliary switch as explained hereinabove with reference to FIGS. 15A and/or 15B. Instead of an IGBT, a MOSFET may be used and the microcontroller 11 may be programmed to switch-off the auxiliary switch's gate slightly later than that of the other switch that would function as a primary switch.

A transmitter system in accordance with the principles set forth above, may be employed to obtain a transient electromagnetic response signal from an earth formation. Such a response signal may be sensed by a receiver antenna that is brought into the earth formation, for instance via a bore-hole or a well bore. Also the transmitter system, or at least the inductive load thereof, in the form of two or more inductive segments each comprising a switch, may be brought into the earth formation. The transient response signal may be received, employing the receiver antenna, following the terminating of energizing of each of the segments by operating each of the switches as described above.

Referring, again, to FIG. 1, the transmitter and receiver antennae are brought in the earth formation via wellbore 39 as part of a LWD sub supported by a drill string.

An electromagnetic signal may be transmitted from the transmitter antenna segments 35, and an electromagnetic induction signal may be created in the form of a response signal such as a voltage response or a current response in the receiver antenna 36.

The response signal may be further processed to locate the mineral hydrocarbon fluid and/or other resistivity anomalies in the earth formation. Details of possible processing are described in US patent application publications 2005/0092487, 2005/0093546, 2005/078481, and 2006/0038571, and in U.S. Pat. No. 5,955,884, already incorporated by reference.

The further processed information may be employed for geosteering purposes. Geosteering may be accomplished by obtaining the transient electromagnetic responses while drilling, and processing the transient responses to locate, for instance, a mineral hydrocarbon fluid reservoir in the earth formation. Geosteering decisions may be made, based on locating any type of electromagnetic anomaly using transient electromagnetic responses. The processed transient electromagnetic induction data may be used to decide where to drill the well bore and/or what is its preferred path or trajectory. For instance, one may want to stay clear from faults. Instead of that, or in addition to that, it may be desirable to deviate from true vertical drilling and/or to steer into the reservoir at the correct depth.

The present invention allows to more accurately locate hydrocarbon fluid containing reservoirs, preferably within a range of between several meters and several hundreds of meters, for instance from about 5 m to 250 m, or for instance from about 5 m to about 100 m. The locality information may advantageously be used to more accurately drill into such reservoirs allowing to produce hydrocarbon fluids from the reservoirs with a minimum of water.

Typically, a shorter depth of investigation requires a faster turn-off time and a lower magnetic moment. A preferred range of magnetic moments generated by the transmitter system is between 5 A·m$^2$ and 200 A·m$^2$, which has been found to strike a good balance between transient signal strength and turn-off time for geo-steering purposes. Another useful parameter is the product of the transmitted magnetic moment and the effective area (i.e. the aggregate enclosed area by all the windings in the receiver coil added together) of the receiver. In down-hole environment, this product is practicably between 0.1 A·m$^4$ and 5000 A·m$^4$.

In order to produce the mineral hydrocarbon fluid from an earth formation, a well bore may be drilled with a method comprising the steps of: suspending a drill string in the earth formation, the drill string comprising at least a drill bit and measurement sub comprising a transmitter antenna and a receiver antenna; drilling a well bore in the earth formation; inducing an electromagnetic field in the earth formation employing the transmitter antenna; detecting a transient electromagnetic response from the electromagnetic field, employing the receiver antenna; and deriving a geosteering cue from the electromagnetic response. Drilling of the well bore may then be continued in accordance with the geosteering cue until a reservoir containing the hydrocarbon fluid is reached.

Once the well bore extends into the reservoir containing the mineral hydrocarbon fluid, the well bore may be completed in any conventional way and the mineral hydrocarbon fluid may be produced via the well bore.

Geosteering may be based on locating an electromagnetic anomaly in the earth formation by obtaining transient electromagnetic response from the formation, analysing the transient response, and taking a drilling decision based on the location. To facilitate executing the drilling decision, the drill string may comprise a steerable drilling system. The drilling decision may comprise controlling the direction of drilling, e.g. by utilizing the steering system if provided, and/or establishing the remaining distance to be drilled. The steerable drilling system may be of conventional type, including rotatable steering systems and sliding mode steering systems.

Accordingly, the geosteering cue may comprise information reflecting distance between the target ahead of the bit and the bit, and/or direction from the bit to target. Distance and direction from the bit to the target may be calculated from the distance and direction from the tool to the bit, provided that the bit has a known location relative to the electromagnetic measurement tool.

Transient electromagnetic induction data may be correlated with the presence of a mineral hydrocarbon fluid containing reservoir, either directly by establishing conductivity values for the reservoir or indirectly by establishing quantitative information on formation layers that typically surround a mineral hydrocarbon fluid containing reservoir. The hydrocarbon content of a reservoir may be quantified from the transient electromagnetic measurements using known resistivity relationships such as Archie's law.

The present invention has been described in relation to particular embodiments, which are intended in all respects to be illustrative rather than restrictive. Alternative embodiments will become apparent to those skilled in the art to which the present invention pertains without departing from its scope.

It will be understood that certain features and sub-combinations are of utility and may be employed without reference to other features and sub-combinations specifically set forth. This is contemplated and within the scope of the claims.

What is claimed is:

1. A down-hole tool comprising a transmitter system for inducing a transient electromagnetic field in an earth formation, comprising
    an induction coil with a number of windings to generate essentially a magnetic dipole field, which number of windings is divided into two or more groups of windings arranged to cooperatively generate the essentially magnetic dipole field when energized; and
    switching means arranged to essentially simultaneously terminate the energizing of the groups of windings;
    wherein the groups of windings are electrically isolated from each other or connected in parallel to each other, at least when the energizing is terminated.

2. The down-hole tool of claim 1, wherein at least one of the two or more groups of windings is physically separated from another one of the two or more groups of windings, to lower mutual inductance between the at least one and the other of the two or more groups of windings.

3. The down-hole tool of claim 1 wherein a snubber circuit is connected in parallel with at least one of the groups of windings.

4. The down-hole tool of claim 3, wherein the snubber circuit comprises a capacitor and a resistor.

5. The down-hole tool of claim 1 wherein the switching means comprises at least one switch and a protection circuit shunting the at least one switch.

6. The down-hole tool of claim 1 wherein at least two of the groups of windings are electrically connected with each other when energized.

7. The down-hole tool of claim 1 wherein at least two of the groups of windings are connected in series with each other when energized.

8. The down-hole tool of claim 1 whereby the switching means comprises two or more switches operated via a common controller to concertedly trigger switching of the switches.

9. The down-hole tool of claim 8, wherein the switches are coupled to control circuitry via at least an opto-coupler.

10. The down-hole tool of claim 1 wherein the switching means comprises a gate transistor.

11. The down-hole tool of claim 10, wherein the gate transistor comprises first and second terminals connected with each other via a gated channel, and a gate terminal, the tool further comprising a potential limiting circuit arranged to limit a potential difference between the gate terminal and one of the first and second terminals.

12. The down-hole tool of claim 1 wherein the switching means comprises a primary switch and an auxiliary switch arranged in series connection with each other, wherein the auxiliary switch is coupled to a delay circuit to delay the switching of the auxiliary switch relative to the switching of the primary switch.

13. A method of inducing a transient electromagnetic field in an earth formation, comprising the steps of:
    providing in the earth formation an inductive load in the form of an induction coil with a number of windings that is divided into two or more groups of windings arranged to cooperatively generate essentially a magnetic dipole field when energized;
    energizing the groups of windings, thereby generating the magnetic dipole field;
    essentially simultaneously terminating the energizing of at least two of the groups of windings wherein, at least after the energizing is terminated, the groups are electrically isolated from each other or connected in parallel to each other.

14. A method of obtaining a transient electromagnetic response signal from an earth formation, comprising the steps of:
    providing a receiver antenna in the earth formation;
    providing, in the earth formation, a transmitter antenna comprising an inductive load in the form of an induction coil with a number of windings that is divided into two or more groups of windings arranged to cooperatively generate essentially a magnetic dipole field when energized, wherein each group has a dedicated switch capable of terminating the energizing of at least that group of windings;

energizing the groups of windings, thereby generating the magnetic dipole field;

essentially simultaneously terminating the energizing of at least two of the groups of windings and, at least after the energizing is terminated, electrically isolating said groups from each other or connecting said groups in parallel to each other; and receiving a transient response signal following the terminating, employing the receiver antenna.

15. A method of producing a mineral hydrocarbon fluid from an earth formation, the method comprising steps of:

drilling a well bore in the earth formation;

providing, in the well bore, an inductive load in the form of an induction coil with a number of windings that is divided into two or more groups of windings arranged to cooperatively generate essentially a magnetic dipole field when energized;

energizing the groups of windings, thereby generating the magnetic dipole field;

essentially simultaneously terminating the energizing of at least two of the groups of windings whereby, at least after the energizing is terminated, they are electrically isolated from each other or connected in parallel to each other;

receiving a transient response signal following the terminating of the energizing;

further processing the transient response signal to locate the mineral hydrocarbon fluid in the earth formation;

continuing drilling the well bore to the hydrocarbon fluid; and producing the hydrocarbon fluid.

* * * * *